(12) United States Patent
Sugita et al.

(10) Patent No.: US 7,085,485 B2
(45) Date of Patent: Aug. 1, 2006

(54) INTERMEDIATE ADAPTER AND CAMERA SYSTEM

(75) Inventors: Jun Sugita, Kanagawa (JP); Masahisa Tamura, Tochigi (JP); Atsushi Koyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 10/901,105

(22) Filed: Jul. 29, 2004

(65) Prior Publication Data

US 2005/0025472 A1      Feb. 3, 2005

(30) Foreign Application Priority Data

Aug. 1, 2003   (JP)   ............................. 2003-205285
Sep. 19, 2003  (JP)   ............................. 2003-329134

(51) Int. Cl.
*G03B 17/00*   (2006.01)

(52) U.S. Cl. ......................................... 396/71; 396/530

(58) Field of Classification Search ................. 396/71, 396/530; 348/360
See application file for complete search history.

(56) References Cited

U.S. PATENT DOCUMENTS

| | | | |
|---|---|---|---|
| 3,838,437 A | 9/1974 | Hamm | 396/530 |
| 4,518,239 A | 5/1985 | Tomori | 396/71 |
| 4,589,750 A | 5/1986 | Tomori et al. | 396/508 |
| 5,734,935 A | 3/1998 | Imanari et al. | 396/71 |
| 2005/0030410 A1* | 2/2005 | Tsukatani et al. | 348/360 |

FOREIGN PATENT DOCUMENTS

| | | |
|---|---|---|
| JP | 3217273 | 6/1997 |
| JP | 3210586 | 9/1997 |
| JP | 2003-195413 | 7/2003 |

OTHER PUBLICATIONS

European Search Report dated Nov. 15, 2004.

* cited by examiner

*Primary Examiner*—W. B. Perkey
(74) *Attorney, Agent, or Firm*—Morgan & Finnegan, LLP

(57) ABSTRACT

The present invention provides an intermediate adapter capable of being mounted on a first camera on which a first interchangeable lens is mounted and a second camera on which the first interchangeable lens and a second interchangeable lens are mounted. The second interchangeable lens includes a protruding portion protruding toward an image plane from its mount reference surface whose protruding amount is larger than that of the first interchangeable lens and has a flange back equal to that of the first interchangeable lens. The first camera has a first wall portion inside its mount and prevents mounting of the second interchangeable lens by the protruding portion of the second interchangeable lens contacting the first wall portion. The second camera includes a second wall portion provided inside its mount at a position retreated from the protruding portion of the second interchangeable lens.

9 Claims, 17 Drawing Sheets

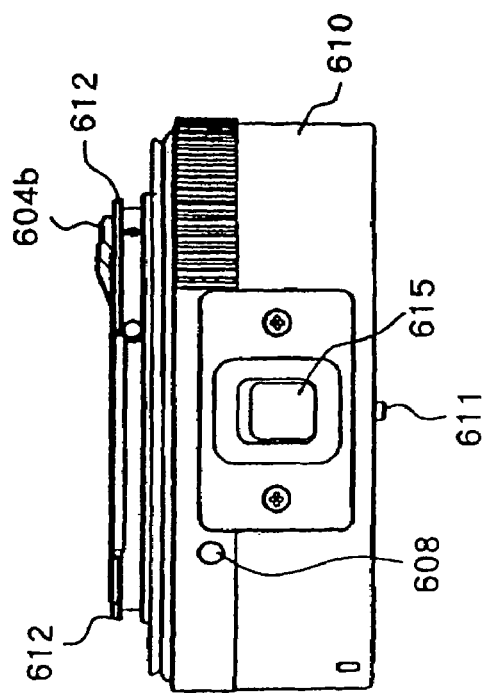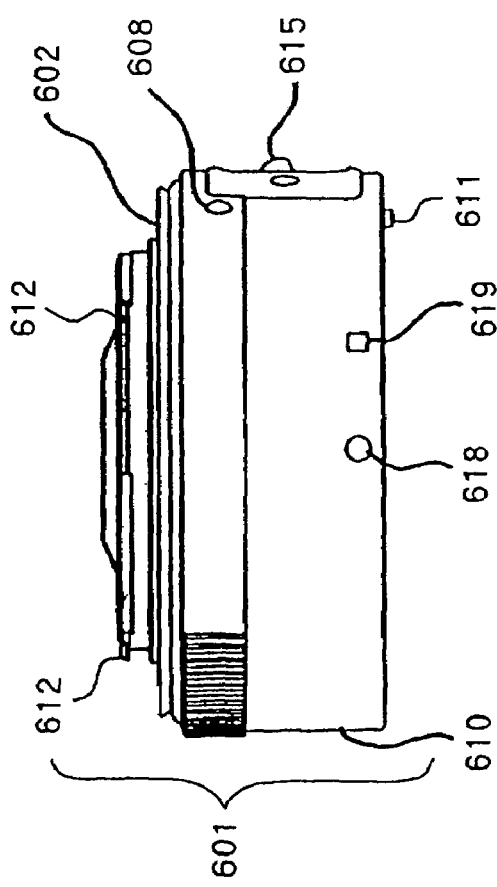

INTERMEDIATE ADAPTER AND CAMERA SYSTEM

BACKGROUND OF THE INVENTION

1. Field of the Invention

The present invention relates to an intermediate adapter that is used in a camera system including a plurality of cameras having a same mount structure and interchangeable lenses having different protruding amounts toward an image plane from its mount reference surface and that is mounted between a camera and a interchangeable lens.

2. Description of Related Art

In recent advancements in applying digital technologies to cameras, single-lens reflex digital cameras have been proposed, in which 35 mm silver halide films are replaced with electronic image pickup elements, such as a CCD sensor and a CMOS sensor, while maintaining the uniformity of a mount structure to allow a conventional group of interchangeable lenses to be mounted and used in a single-lens reflex camera system, a lens of which can be replaced. However, since the electronic image pickup elements, such as a CCD sensor and a CMOS sensor, having the same size as the 35 mm silver halide films, are expensive, the image pickup elements (for example, image pickup elements having an APS-C size) smaller than the 35 mm films have been mainly used.

In such a single-lens reflex digital camera using an image pickup element smaller than the 35 mm film, since an image circle is smaller than that of the 35 mm film, a quick return mirror in a camera body can be made small, and also the size of the camera body can be reduced. Further, when the quick return mirror is made small compared to those of the conventional case, back focus of the interchangeable lens can be shortened in comparison with that of the conventional interchangeable lens. Then, the image circle is smaller compared to the conventional interchangeable lenses, thereby achieving small-sized interchangeable lenses.

However, when the interchangeable lens having a short back focus is mounted on a body of the 35 mm film camera or a digital camera having an image circle larger than that of the interchangeable lens, the rear end portion of the interchangeable lens and the quick return mirror may interfere with each other. Further, when an interchangeable lens only for a digital camera having a short back focus (having a small image circle) is arranged to be mounted on the camera body of a conventional camera system, there is a disadvantage in that a light flux does not reach the periphery of the image pickup plane.

Thus, mechanism for preventing the interchangeable lens from being mounted on the camera body in such a way is needed.

In Japanese Patent No. 3217273, a camera system, a camera body and an interchangeable lens are disclosed. In this camera system, a common mount is used and the interchangeable lens having a back focus smaller than a predetermined value is restricted to be mounted thereon. In this camera system and the like, by providing a flange portion inside the mount of the conventional camera body and by arranging a fixed protrusion provided on the interchangeable lens having a short back focus to come into contact with the flange portion, the mounting of the interchangeable lens is prevented.

On the other hand, in the lens-interchangeable camera system in which the interchangeable lens is mounted on the camera body, the connection is usually made with a bayonet mount, and there is an advantage in that the connection can be completed quickly and surely at a small rotation angle. In the case of using the bayonet mount, in order to indicate an inserting angular position (phase) when mounting the interchangeable lens on the camera body, mounting indexes are provided on the camera body and the interchangeable lens. A user can complete the mounting by inserting the interchangeable lens into the camera body in a state in which the respective mounting indexes are matched with each other and by rotating the interchangeable lens in a predetermined rotation direction by a predetermined rotation amount until a stopper or a locking pin is locked.

In addition, as an accessory of the lens-interchangeable camera system, there is known an intermediate adapter having the function of allowing close-up image taking by extending the back focus of an interchangeable lens, or of increasing an image magnification of the interchangeable lens, with the intermediate adapter mounted between the camera body and the interchangeable lens.

In Japanese Patent No. 3210586, an intermediate adapter capable of being used in a camera system including interchangeable lenses having different back focuses described above is disclosed.

However, Japanese Patent No. 3217273 and Japanese Patent No. 3210586 do not disclose how a user can recognize that the camera bodies or interchangeable lenses are associated with which systems to perform connection operation, although the mount shape (structure) is identical and the interchangeable lenses or camera bodies can be associated with different back focuses.

In addition, in the camera system disclosed in Japanese Patent No. 3210586, since an intermediate adapter which can be mounted on an interchangeable lens having a back focus larger than a predetermined value and an intermediate adapter preventing mounting of an interchangeable lens having a back focus smaller than the predetermined value are prepared separately, usable combinations of interchangeable lenses and cameras are limited when a user has only one intermediate adapter.

SUMMARY OF THE INVENTION

It is an object of the present invention to provide an intermediate adapter capable of mounting a plurality of interchangeable lenses having different protruding amounts toward an image plane from a mount reference surface to two types of cameras, namely a camera to which an interchangeable lens having a large protruding amount is prevented from being mounted and a camera to which the interchangeable lens having a large protruding amount is allowed to be mounted. It is another object of the present invention to provide an intermediate adapter capable of being easily mounted on the interchangeable lens and the camera.

According to an aspect of the present invention, there is provided an intermediate adapter used in a camera system. The camera system comprises a first interchangeable lens, a second interchangeable lens, first camera, and a second camera. The second interchangeable lens includes a protruding portion protruding toward an image plane from a mount reference surface whose protruding amount is larger than that of the first interchangeable lens, and has a flange back is equal to that of the first interchangeable lens. The first camera on which the first interchangeable lens is mounted includes a first wall portion inside its mount and prevents mounting of the second interchangeable lens by the protruding portion of the second interchangeable lens contacting the first wall portion. The second camera, on which the first interchangeable lens and the second interchangeable lens are selectively mounted, includes a second wall portion provided inside its mount at a position retreated from the protruding portion of the second interchangeable lens. The intermediate adapter comprises a third wall portion provided inside its mount at a position retreated from the protruding portion of the second interchangeable lens. Here, the intermediate adapter is mounted between the first interchangeable lens and the first and second cameras, and is mounted between the second interchangeable lens and the first and second cameras.

Further, according to another aspect of the present invention, there is provided an intermediate adapter to be mounted between a camera and an interchangeable lens. The intermediate adapter comprises a plurality of indexes provided on an interchangeable lens-side of the intermediate adapter and serves as marks when being mounted on the interchangeable lens. Here, the plurality of the indexes are provided at different phase positions on the intermediate adapter.

Features of the intermediate adapter and the camera system according to the present invention will be clarified from the following description of specific embodiments with reference to the accompanying drawings.

BRIEF DESCRIPTION OF THE DRAWINGS

FIGS. 16A and 16B are respectively a top view and a side view of the intermediate adapter according to Embodiment 2 of the present invention;

FIG. 17 is a perspective view of the intermediate adapter according to Embodiment 2 of the present invention, wherein FIG. 17A is a perspective view thereof as seen from the lens mounting side, and FIG. 17B is a perspective view thereof as seen from the camera mounting side;

DETAILED DESCRIPTION OF PREFERRED EMBODIMENTS

Hereinafter, embodiments of the present invention will be described with reference to the accompanying drawings.

Embodiment 1

Figure 1:
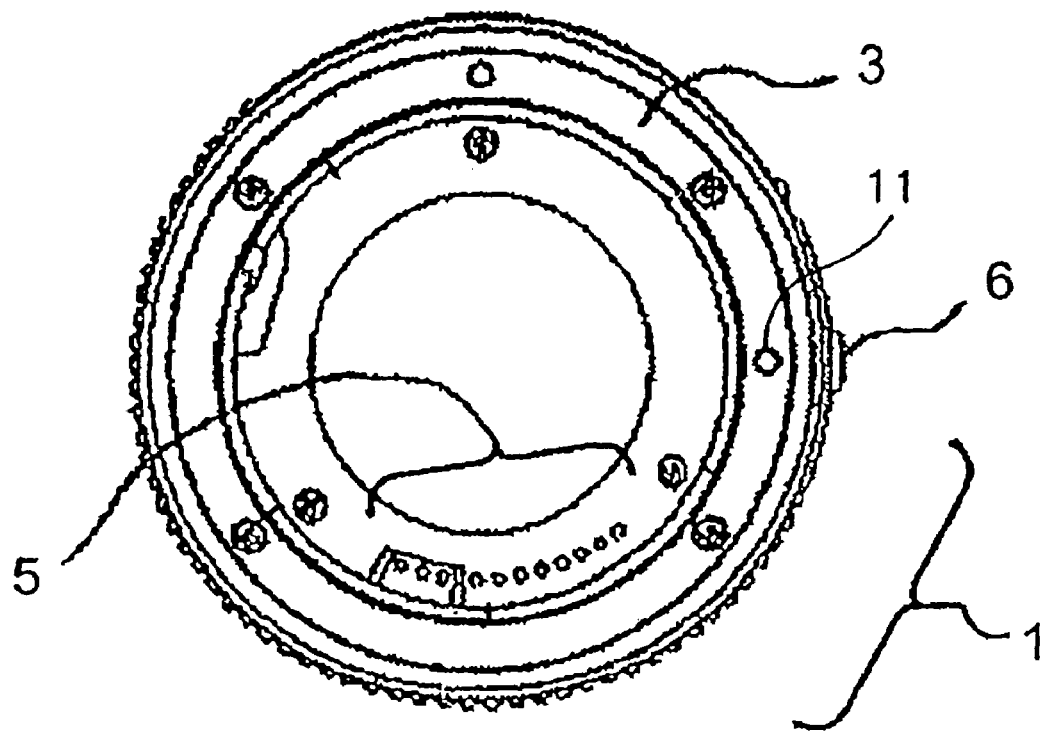
FIG. 1 is a front view of an intermediate adapter according to Embodiment 1 of the present invention.
Figure 2:
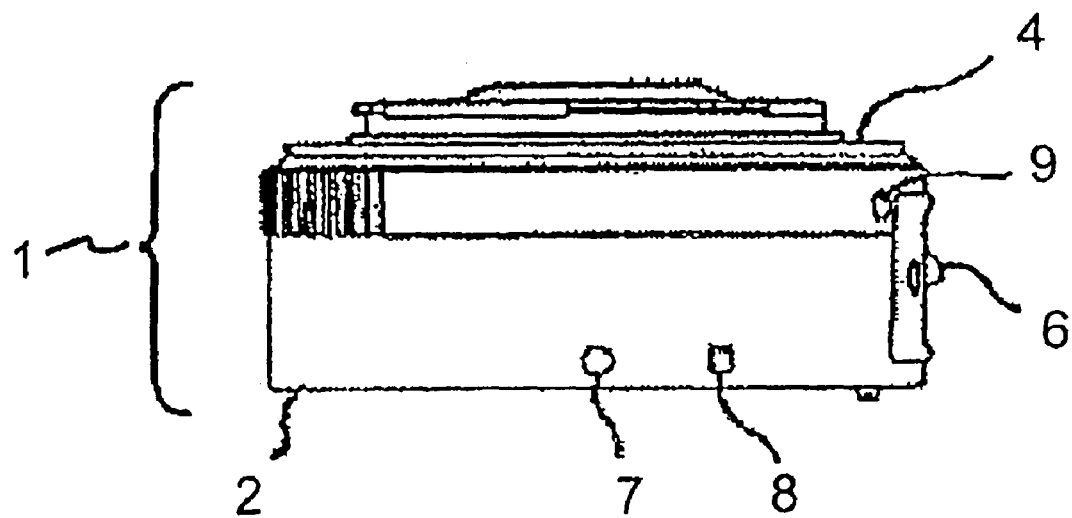
FIG. 2 is a top view of the intermediate adapter according to Embodiment 1 of the present invention.
Figure 3:
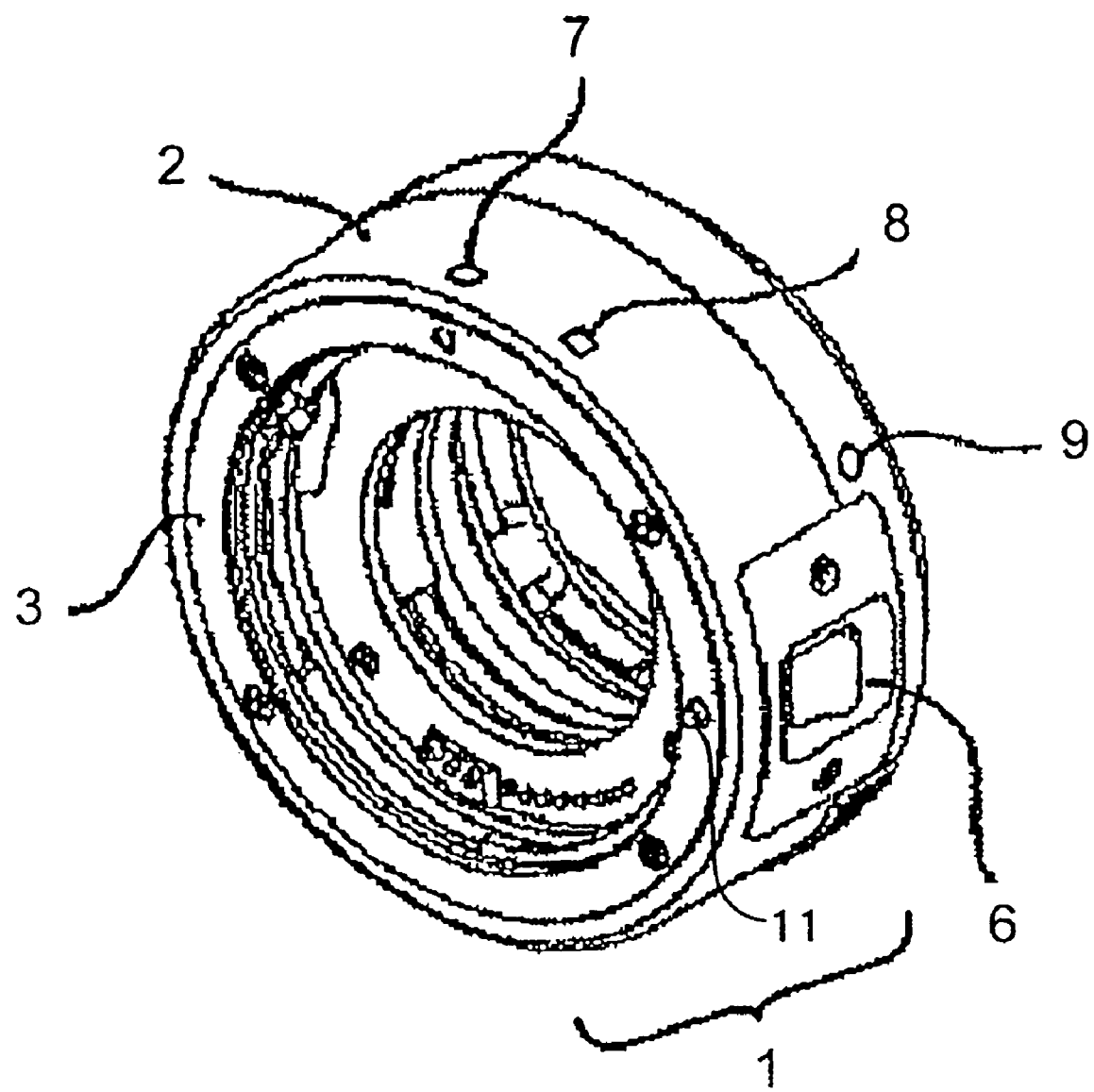
FIG. 3 is a perspective view of the intermediate adapter according to Embodiment 1 of the present invention.

FIG. 1 is a front view of an intermediate adapter allowing close-up image-taking, which is Embodiment 1, FIG. 2 is a top view of the intermediate adapter, and FIG. 3 is a perspective view of the intermediate adapter.

In FIGS. 1, 2, and 3, reference numeral 1 denotes an intermediate adapter, reference numeral 2 denotes an adapter body, reference numeral 3 is a lens-side mount, and reference numeral 4 is a camera-side mount. On the lens-side mount 3 and the camera-side mount 4 respectively, a bayonet lug, which can be engaged with a bayonet lug provided on a mount of an interchangeable lens and a bayonet lug provided on a mount of a camera, is provided.

Reference numeral 5 denotes electrical connection pins on the interchangeable lens side and the camera side, and the electrical connection pins 5 are used for transmitting electric signals for control. Reference numeral 6 denotes a lock release lever for releasing the locking of a lock pin 11 which connects and holds the interchangeable lens. Reference numeral 7 denotes a first lens-side mounting index indicating a mounting angular position (phase) for a group of interchangeable lenses manufactured based on a first back focus standard, and reference numeral 8 is a second lens-side mounting index indicating a mounting angular position (phase) for a group of interchangeable lenses manufactured based on a second back focus standard. Further, reference numeral 9 is a camera-side mounting index for matching the intermediate adapter 1 with the mounting index of the camera.

Furthermore, the intermediate adapter 1 can be mounted on any interchangeable lens having the first and second back focus standards respectively, without interfering with each other.

Figure 4:
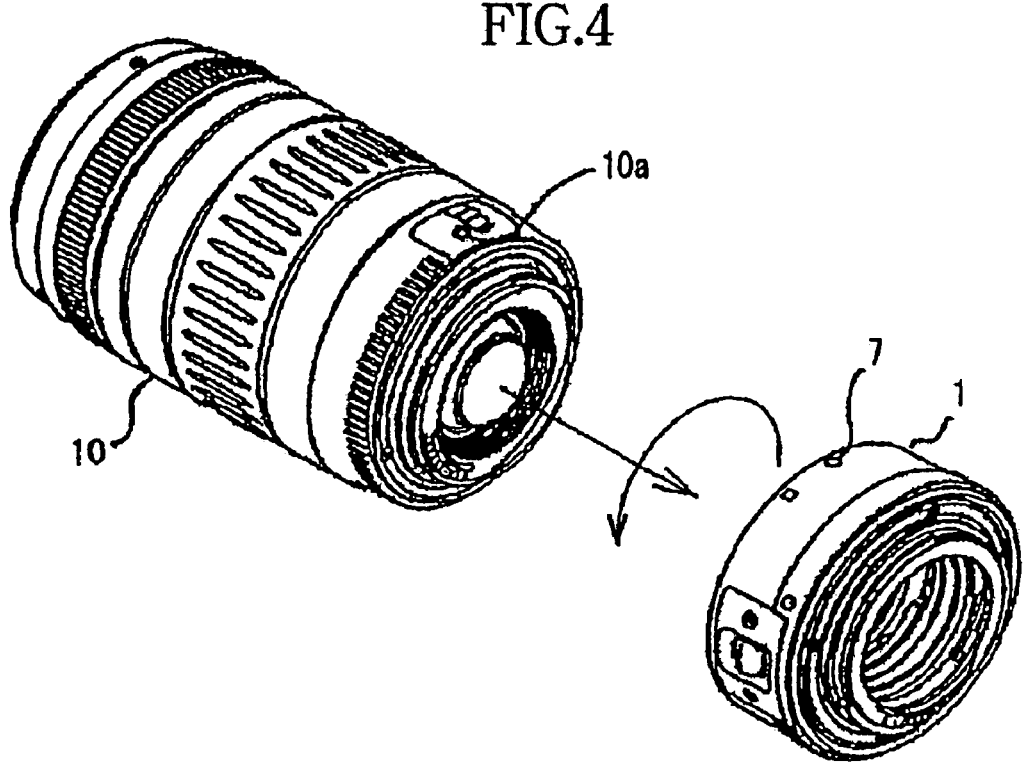
FIG. 4 is a perspective view illustrating an angular phase when an interchangeable lens manufactured based on a first back focus standard is mounted on the intermediate adapter according to Embodiment 1.
Figure 5:
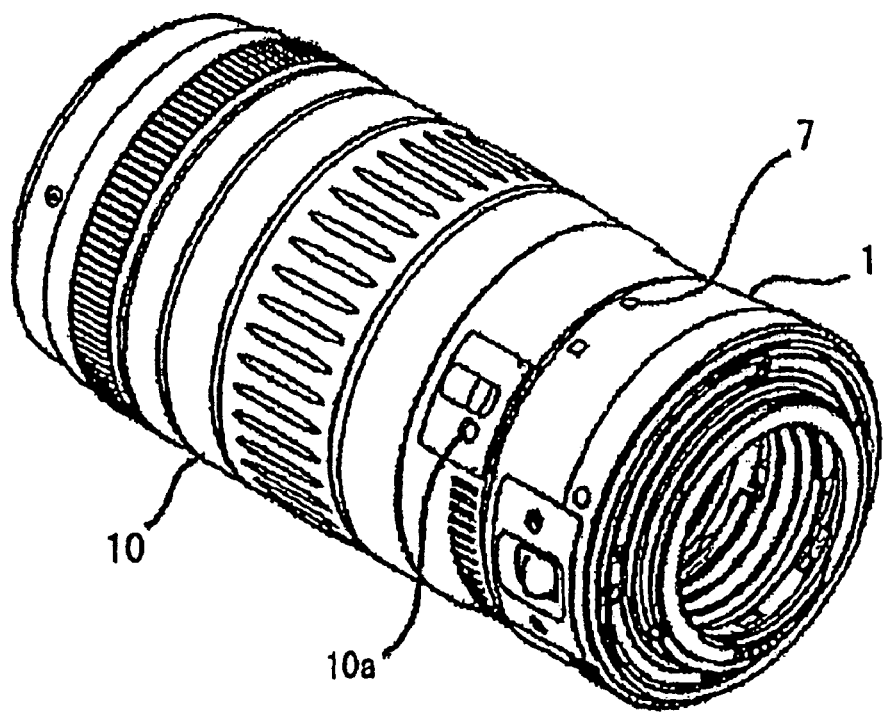
FIG. 5 is a perspective view illustrating a state when the interchangeable lens manufactured based on the first back focus standard has been completely mounted on the intermediate adapter according to Embodiment 1.

Next, the mounting procedure of the intermediate adapter 1 will be described with reference to FIGS. 4 and 5. When the intermediate adapter 1 is mounted on the interchangeable lens 10 manufactured based on the first back focus standard, the first lens-side mounting index 7 of the intermediate adapter 1 is matched with a mounting index 10a of the interchangeable lens 10, the lens-side mount 3 is inserted onto the mount of the interchangeable lens 10, and then the interchangeable lens 10 is rotated until the locking pin 11 provided on the intermediate adapter 1 is locked. As a result, the intermediate adapter 1 can be mounted on the interchangeable lens 10 by means of the coupling of the bayonet lug.

Further, when the intermediate adapter 1 mounted on the interchangeable lens 10 is mounted on a camera body (not shown), the camera-side mounting index 9 is matched with a mounting index of the camera body, the camera-side mount 4 is inserted onto the mount of the camera body, and the intermediate adapter is rotated until the locking pin on the camera side latches onto the camera-side mount 4, thereby completing the mounting of the intermediate adapter.

Figure 6:
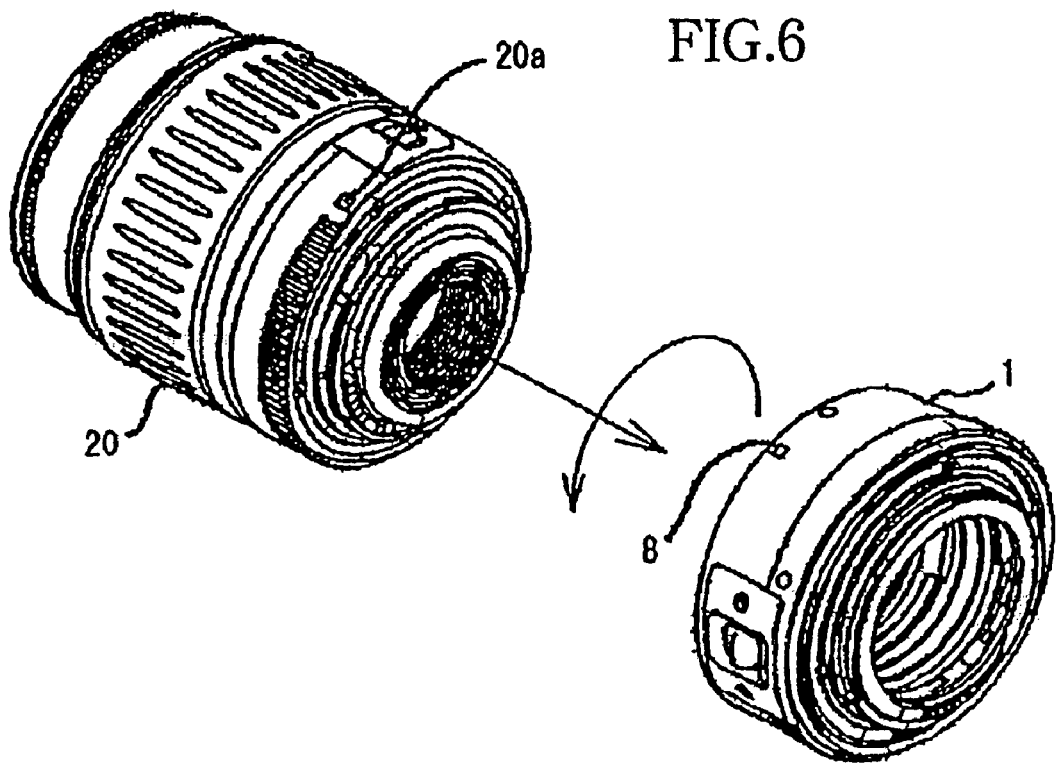
FIG. 6 is a perspective view illustrating an angular phase when an interchangeable lens manufactured based on a second back focus standard is mounted on the intermediate adapter according to Embodiment 1.
Figure 7:
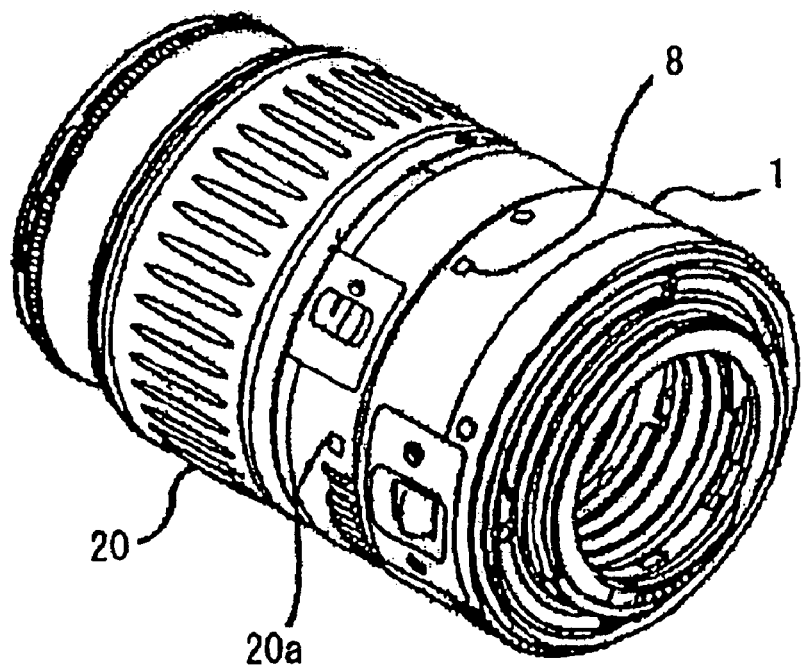
FIG. 7 is a perspective view illustrating a state when the interchangeable lens manufactured based on the second back focus standard is completely mounted on the intermediate adapter according to Embodiment 1.

Subsequently, the mounting operation of the intermediate adapter 1 to the interchangeable lens 20 manufactured based on the second back focus standard will be described with reference to FIGS. 6 and 7. The angular position of the second lens-side mounting index 8 of the intermediate adapter 1 is matched with respect to a mounting index 20a of the interchangeable lens 20, the lens-side mount 3 is inserted onto the mount of the interchangeable lens 20, and then the interchangeable lens 20 is rotated until the camera-side locking pin is locked, the intermediate adapter 1 thereby mounted on the interchangeable lens 20.

Furthermore, when the intermediate adapter 1 mounted on the interchangeable lens 20 is mounted on the camera body (not shown), the camera-side mounting index 9 of the intermediate adapter 1 is matched with the mounting index of the camera body, the camera-side mount 4 is inserted onto the mount of the camera body, and then the intermediate adapter is rotated until the camera-side locking pin is locked, thereby the mounting of the intermediate adapter is completed.

Further, although the two mounting indexes are exemplified in this embodiment, three or more mounting indexes have the same advantage. Further, although the first mounting index 10a is made in a circular shape and the second mounting index 20a is made in a rectangular shape in this embodiment, their shapes are not limited thereto if only the shapes are determined in accordance with the respective back focus standards, and the same is also applied to the colors. Furthermore, although the intermediate adapter according to this embodiment has been exemplified as an intermediate adapter for performing the close-up image taking operation, it may be used as an intermediate adapter for increasing an image-taking magnification.

Embodiment 2

The interchangeable lens, the camera, and the intermediate adapter described in Embodiment 1 will be denoted by new reference numerals and be described in detail as Embodiment 2 with reference to FIGS. 8 to 21. Here, first and second cameras will be described as digital cameras comprising image pickup elements. Further, in the following description, "front" denotes the object side, and "rear" denotes the image plane side or the image pickup element side.

Figure 11:
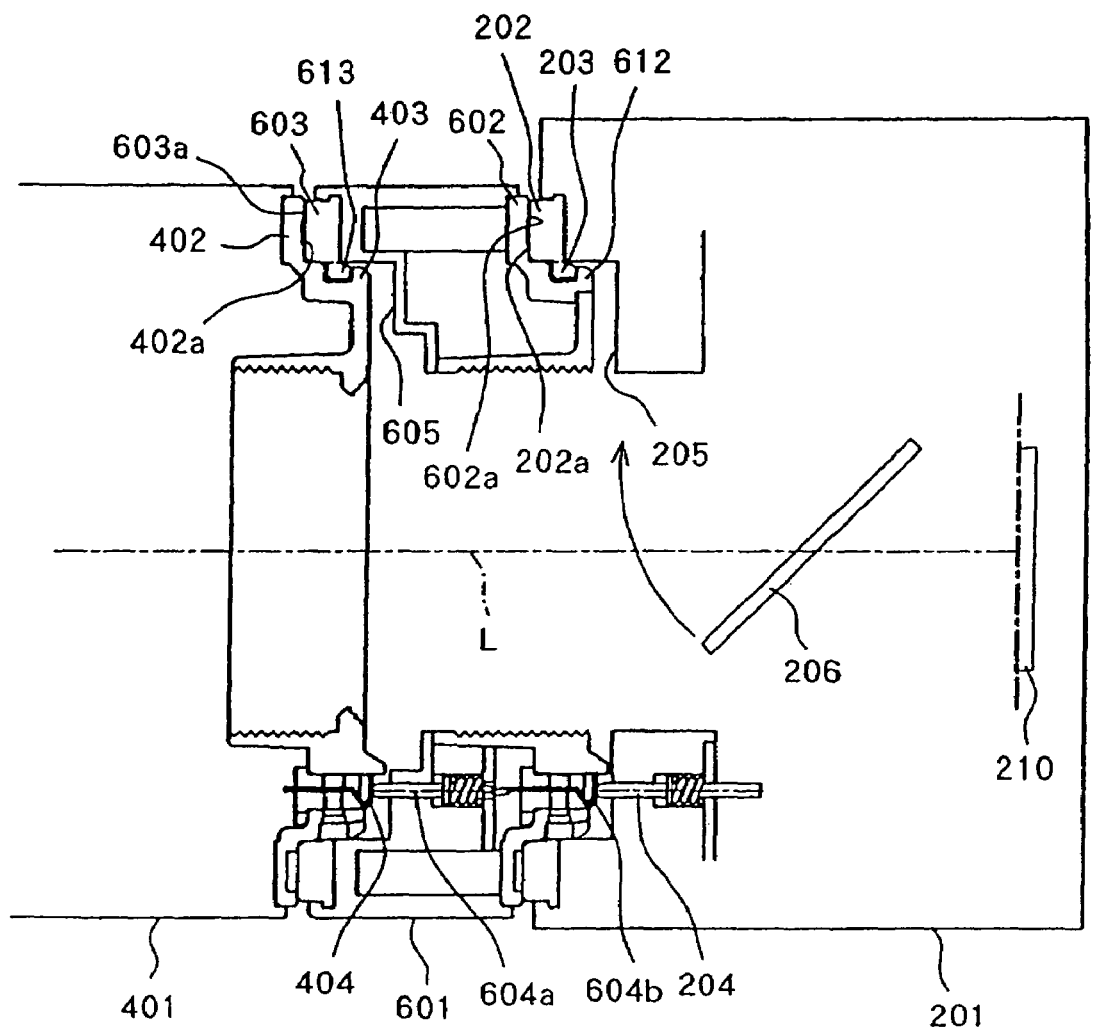
FIG. 11 is a cross-sectional view illustrating a combination of the first camera and the first interchangeable lens using the intermediate adapter according to Embodiment 2 of the present invention.
Figure 12:
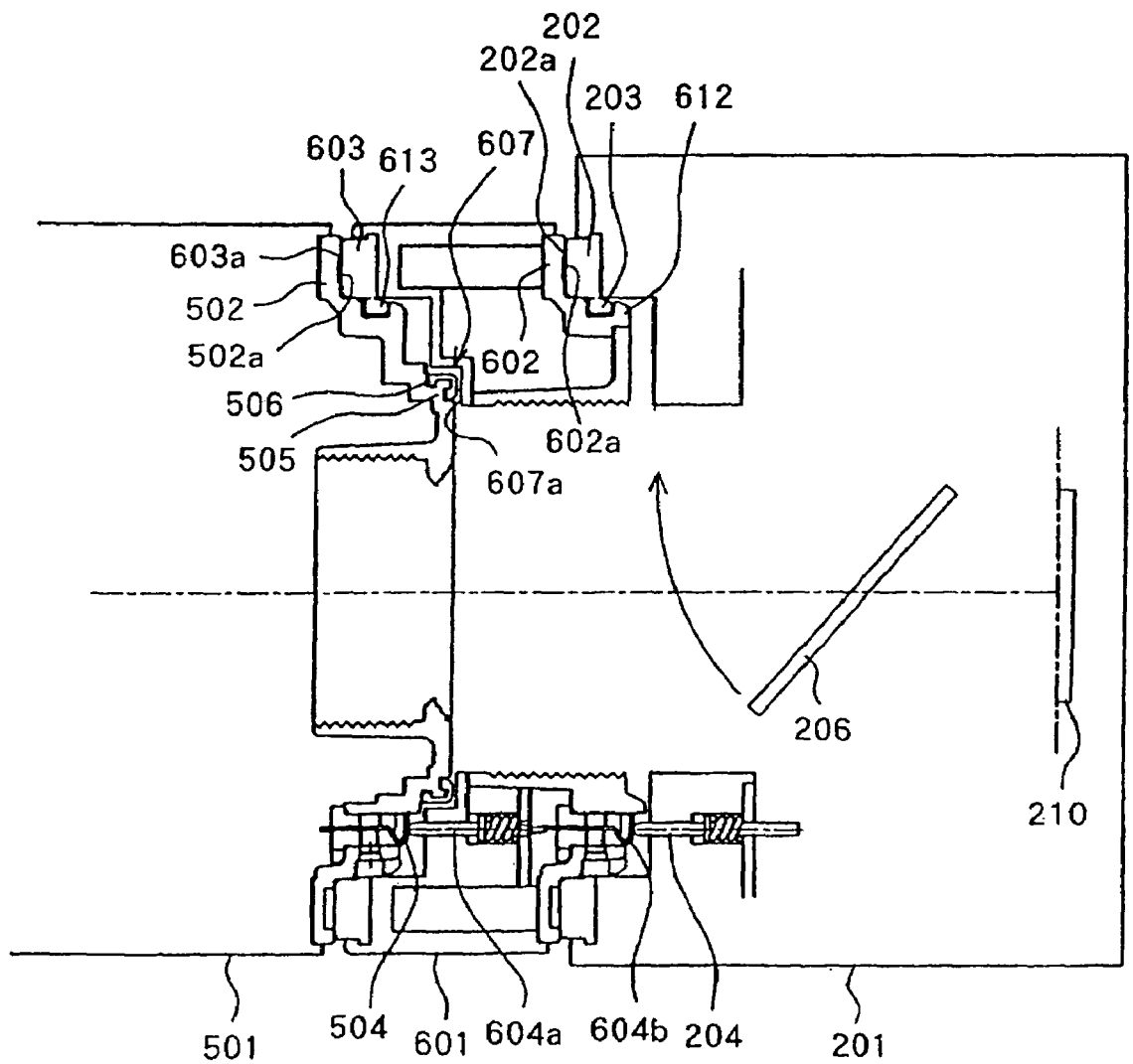
FIG. 12 is a cross-sectional view illustrating a combination of the first camera and the second interchangeable lens using the intermediate adapter according to Embodiment 2 of the present invention.
Figure 13:
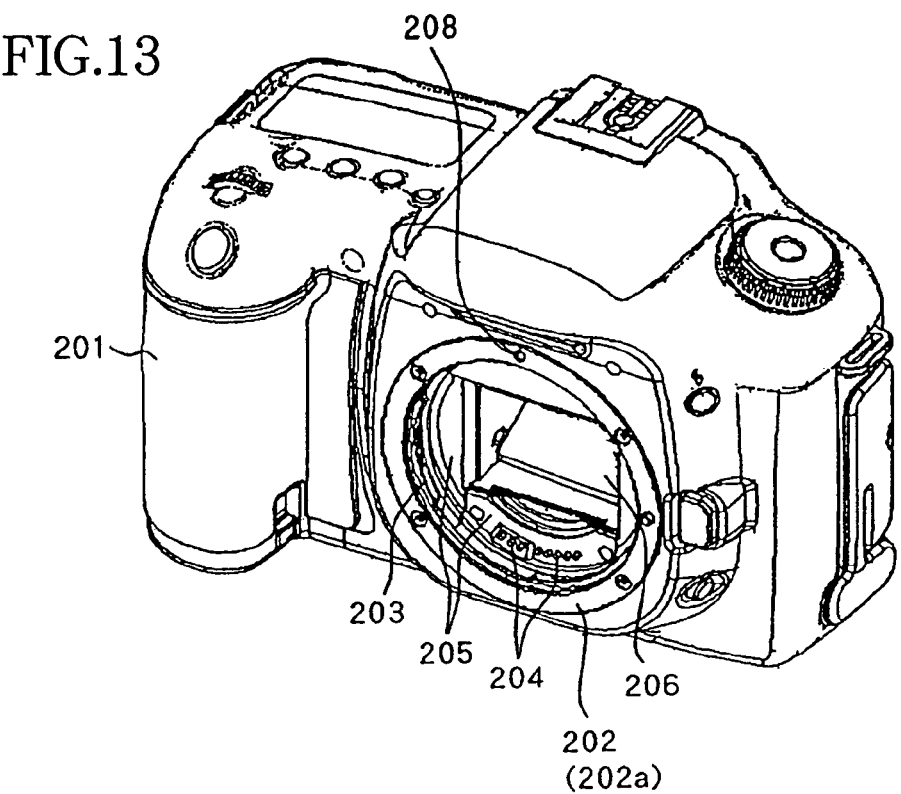
FIG. 13 is a perspective view of the first camera on which the intermediate adapter according to Embodiment 2 of the present invention can be mounted.

FIGS. 11, 12, and 13 show a first camera (a camera body) 201 constituting a camera system according to Embodiment 2. A ring-shaped mount 202 for mounting a first interchangeable lens or an intermediate adapter, as will be described later, is located at the front surface of the first camera 201. The front end surface of the mount 202 serves as a reference surface (mount reference surface) 202a when the first interchangeable lens or the intermediate adapter is mounted thereon.

At a position retreated to the rear side from the mount reference surface 202a at the radially inner side of the mount 202 (on the inner radial side), three bayonet lug 203 for bayonet coupling to the first interchangeable lens or the intermediate adapter are formed in the circumferential direction.

Further, at a position retreated to the rear side from the position where the bayonet lug 203 are located, a wall portion (a first wall portion) 205, which is perpendicular to the optical axis L (see FIGS. 11 and 12), that is, parallel to the mount reference surface 202a, is formed as a part of a mirror box. A rectangular opening is formed at the inner side of the wall portion 205. A quick return mirror 206 is placed at a position retreated to the rear side from the opening, and an image pickup element 210 such as a CCD or CMOS sensor is located at the rear side behind the quick return mirror (see FIGS. 11 and 12). The quick return mirror 206 is to be rotated in the rear side with respect to the wall portion 205.

In addition, a plurality of electrical connection pins 204 are located at the lower area of the wall portion 205. The electrical connection pins 204 is for performing communication with the first interchangeable lens directly mounted on the first camera 201 or the first or second interchangeable lens mounted through the intermediate adapter, and for supplying electric power to the interchangeable lenses.

Further, as shown in FIG. 13, at the upper portion of the front end surface of the mount 202, there is provided a red circular camera-side index (hereinafter, referred to as a lens mounting index) 208 serving as a mark for matching the phases of the bayonet lug of the first interchangeable lens or the intermediate adapter with the phases where the bayonet lug 203 do not exist in the first camera 201 (portions between two adjacent bayonet lug 203 in the circumferential direction), when the first interchangeable lens or the intermediate adapter is mounted on the first camera through bayonet coupling.

Figure 8:
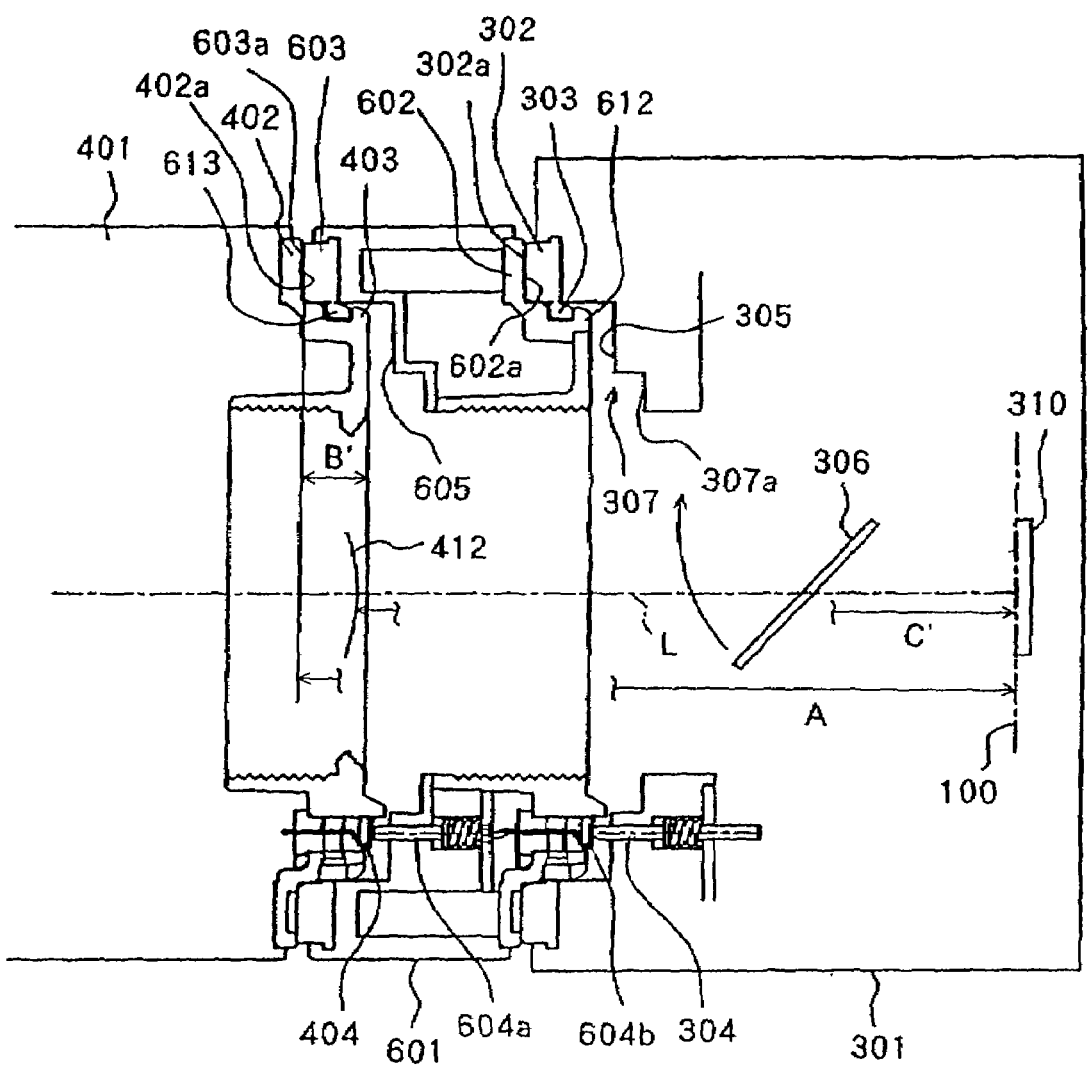
FIG. 8 is a cross-sectional view illustrating a combination of a second camera and a first interchangeable lens using an intermediate adapter according to Embodiment 2 of the present invention.
Figure 9:
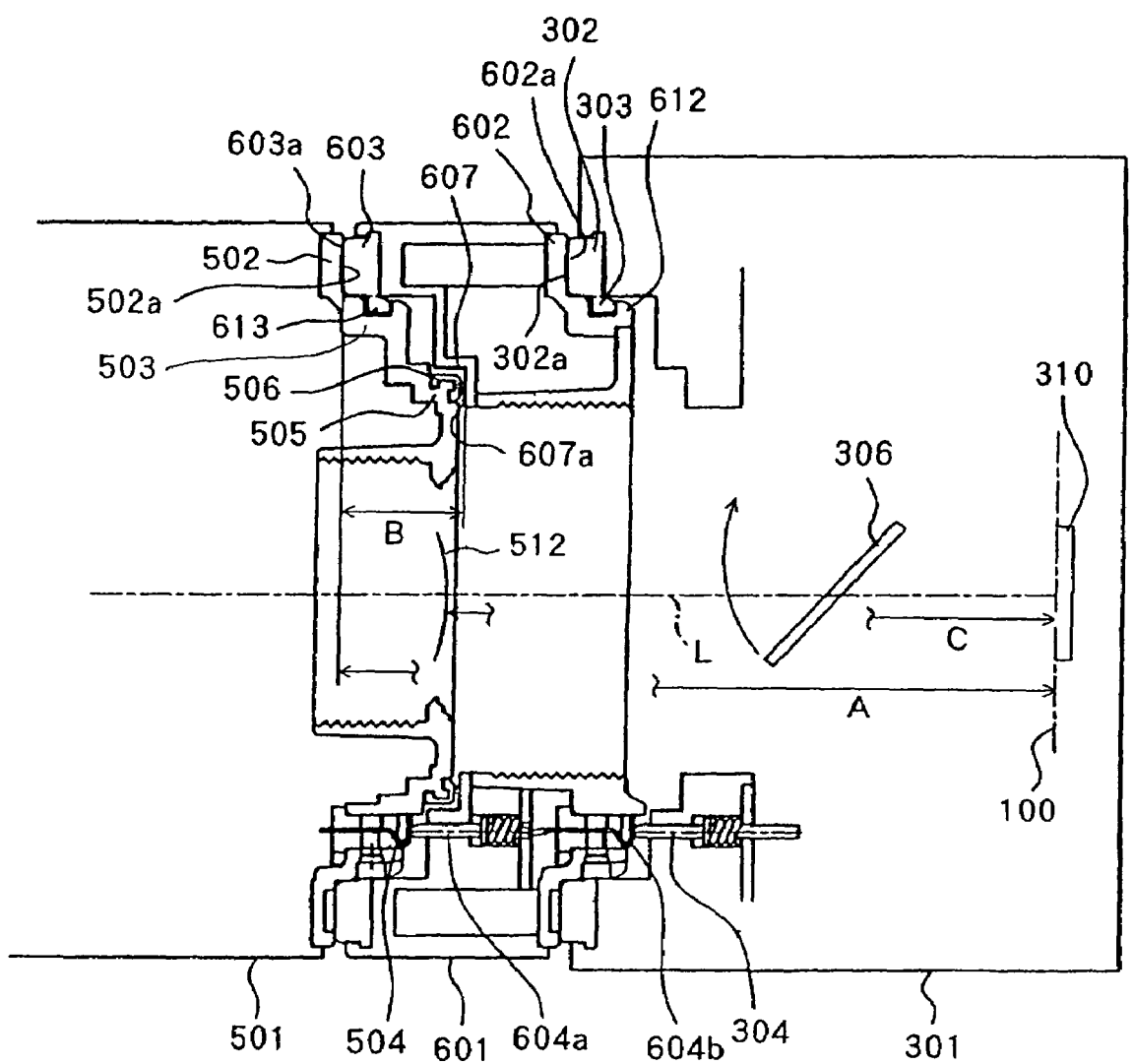
FIG. 9 is a cross-sectional view illustrating a combination of the second camera and a second interchangeable lens using the intermediate adapter according to Embodiment 2 of the present invention.
Figure 10:
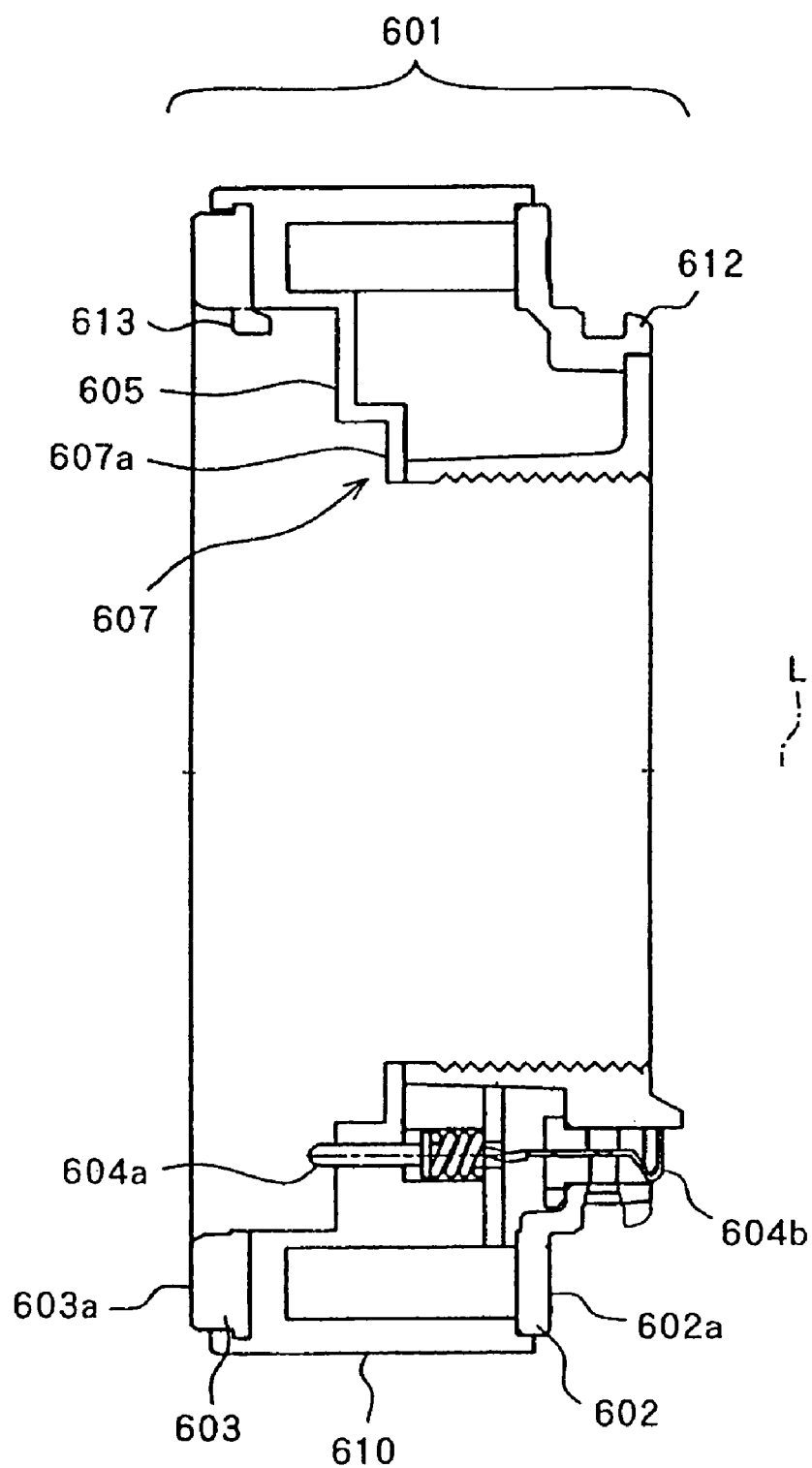
FIG. 10 is a cross-sectional view of the intermediate adapter according to Embodiment 2 of the present invention.
Figure 14:
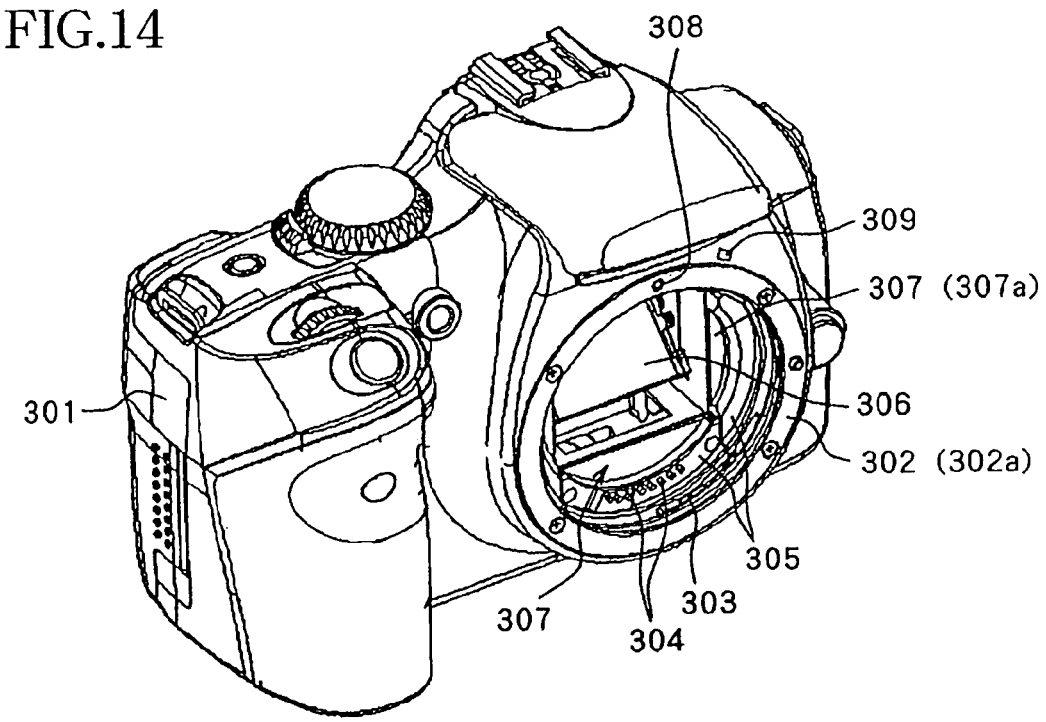
FIG. 14 is a perspective view of the second camera on which the intermediate adapter according to Embodiment 2 of the present invention can be mounted.

FIGS. 8, 9, and 14 show a second camera (a camera body) 301. A ring-shaped mount 302 is placed at the front surface of the second camera 301 for mounting the first or second interchangeable lens or the intermediate adapter as will be described later. The front end surface of the mount 302 serves as a reference surface (mount reference surface) 302a when the first or second interchangeable lens or the intermediate adapter is mounted.

At a position retreated to the rear side from the mount reference surface 302a at the radially inner side of the mount 302 (on the inner radial side), three bayonet lug 303 for bayonet coupling to the first or second interchangeable lens or the intermediate adapter are formed in the circumferential direction.

Further, at a position retreated to the rear side from the position where the bayonet lug 303 are located, a wall portion 305, which is perpendicular to the optical axis L (see FIGS. 8 and 9), that is, parallel to the mount reference surface 302*a*, is formed as a part of a mirror box. Here, the length from the mount reference surface 302*a* to the wall portion 305 and the length from the mount reference surface 202*a* to the wall portion 205 in the first camera 201 are the same.

Further, inside the wall portion 305, a reception portion 307 for receiving a protruding portion provided on the rear end side of the second interchangeable lens, as will be described later, is formed. The reception portion 307 has a concave shape recessed to the rear side from the wall portion 305, and a rectangular opening is formed in the rear end surface (a second wall portion) 307*a*.

Further, a quick return mirror 306 is placed at a position retreated to the rear side from the opening, and an image pickup element 310 such as a CCD or CMOS sensor is fixed on the rear side behind the quick return mirror. (See FIGS. 8 and 9.)

Here, in the second camera 301 according to Embodiment 2, the image pickup element 310 being smaller than the image pickup element 210 of the first camera 201 is used in accordance with an image circle smaller than that of the first camera 201. For this reason, the quick return mirror 306 is smaller compared to the quick return mirror 206 of the first camera 201, and the quick return mirror 306 is to be rotated on the rear side with respect to the rear end surface 307*a* of the reception portion 307. By reducing the sizes of the quick return mirror 306 and the image pickup element 310, the second camera 301 can be made small compared to the first camera 201.

Further, a plurality of electrical connection pins 304 are located at the lower area of the wall portion 305. The electrical connection pins 304 is for performing communication with the first or second interchangeable lens mounted on the second camera 301 directly or through the intermediate adapter, and supply electric power to the interchangeable lenses.

In addition, as shown in FIG. 14, at the upper area of the front end surface of the mount 302, there is provided a red circular camera-side index (hereinafter, referred to as a first lens mounting index) 308 serving as a mark for matching the phases of the bayonet lug of the first interchangeable lens or the intermediate adapter with the phases where the bayonet lug 303 do not exist in the second camera 301 (portions between two adjacent bayonet lug 303 in the circumferential direction), when the first interchangeable lens or the intermediate adapter is mounted on the second camera 301 through bayonet coupling.

In addition, at the outside portion of the mount 302 in the front surface of the camera body, there is provided a white rectangular camera-side index (hereinafter, referred to as a second lens mounting index) 309 serving as a mark for matching the phases of the bayonet lug of the second interchangeable lens with the phases where the bayonet lug 303 do not exist in the second camera 301 (the portions between two adjacent bayonet lug 303 in the circumferential direction), when the second interchangeable lens is mounted on the second camera 301 through bayonet coupling.

Figure 18:
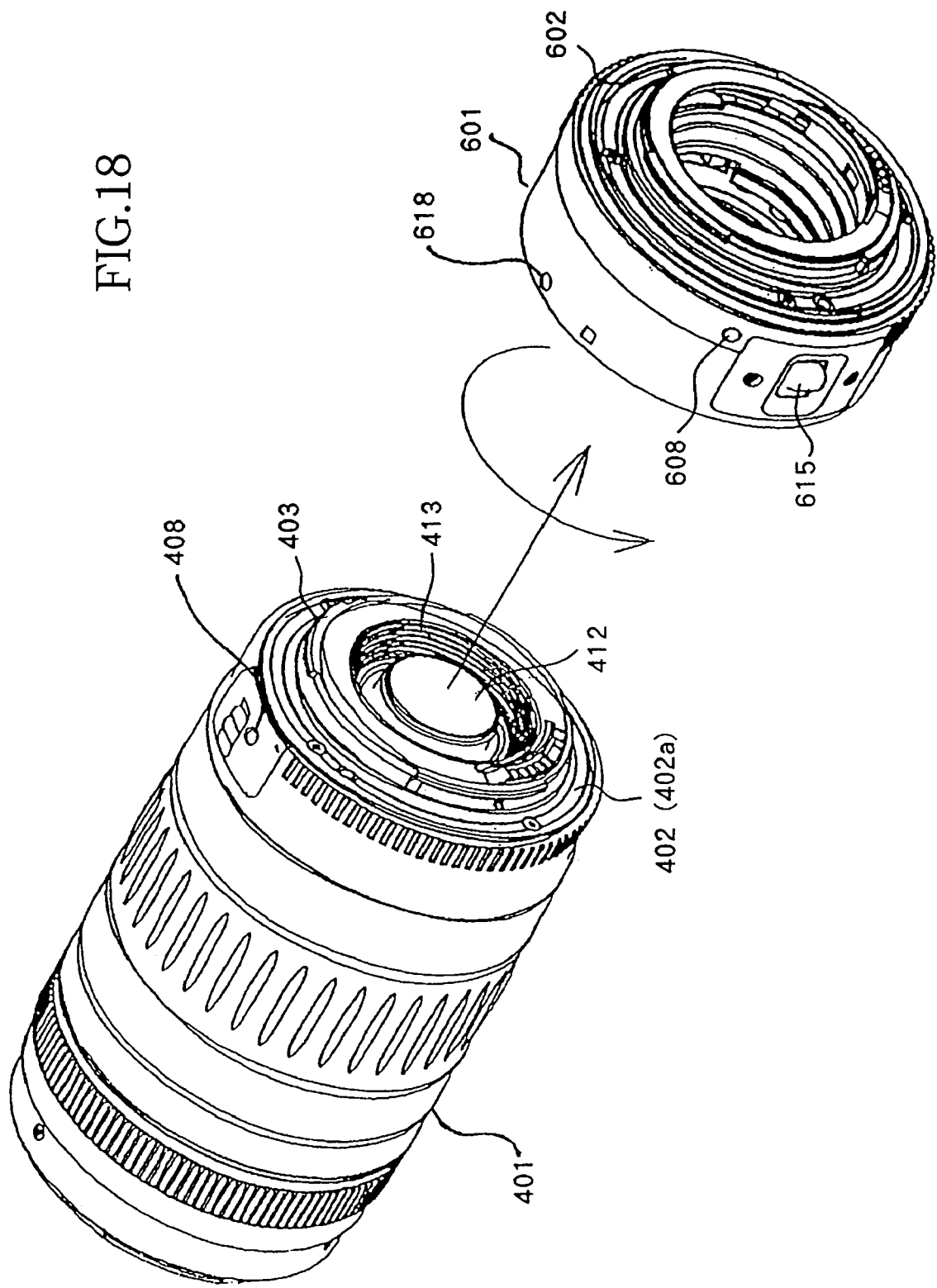
FIG. 18 is a perspective view illustrating a phase when the first interchangeable lens is mounted on the intermediate adapter according to Embodiment 2 of the present invention.

The first interchangeable lens 401 is shown in FIGS. 8, 11, 18, and 19. A plurality of optical lenses are arranged inside the first interchangeable lens 401. Only the rear end surface of the optical lens 412 positioned at a rearmost end is shown in FIGS. 8 and 18. A ring-shaped mount 402 is located at the rear portion of the first interchangeable lens 401. The rear end surface of the outermost portion of the mount 402 serves as a reference surface (mount reference surface) 402*a* when the first camera 201 or the second camera 301 or the intermediate adapter is mounted.

In addition, the radially internal portion of the mount 402 from the mount reference surface 402*a* has a shape protruding toward the rear side, and three bayonet lug 403 which can be engaged with the bayonet lug of the first and second cameras 201 and 301 and the intermediate adapter are formed in the outer circumference direction of the rear end of the protruding portion. The rear end surfaces of the bayonet lug 403 constitute the rear end surface of the first interchangeable lens 401.

In addition, at the lower area of the rear end surface of the first interchangeable lens 401, a plurality of electrical connection points 404 for communicating with the first and second cameras on which the first interchangeable lens 401 is mounted directly or through the intermediate adapter, and for supplying electric power from the cameras are provided. Although these electrical connection points 404 are provided at a position protruding slightly toward the rear side from the rear end surface of the first interchangeable lens 401, the protruding amount of the electrical connection points 404 will be neglected in the following description.

In addition, an optical lens 412 is held in the innermost radial portion of the mount 402 through a lens holding member 413. Further, the optical lens 412 may be fixed or may be movable in the direction of the optical axis.

Figure 19:
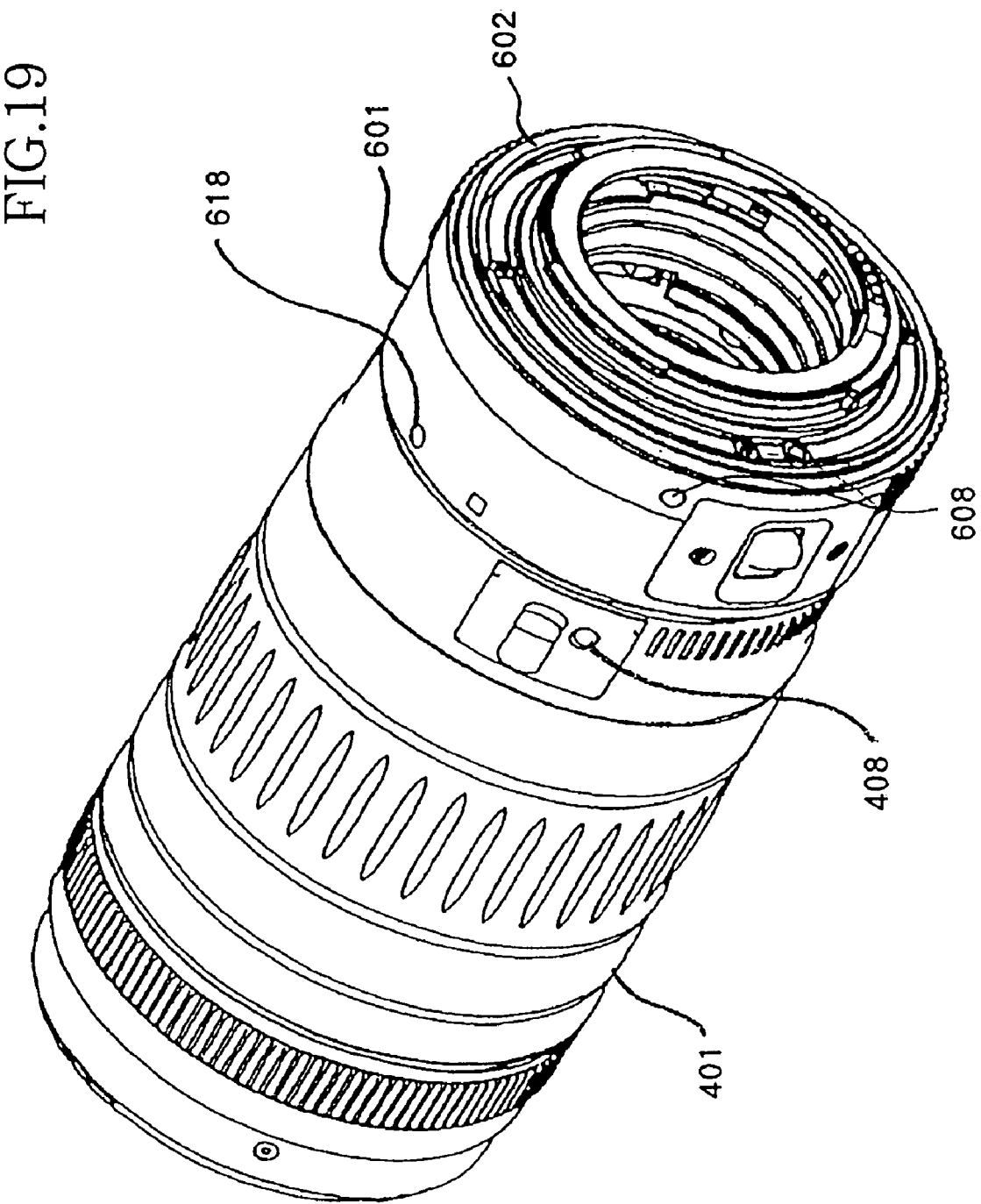
FIG. 19 is a perspective view illustrating a state when the first interchangeable lens is completely mounted on the intermediate adapter according to Embodiment 2 of the present invention.

Furthermore, as shown in FIGS. 18 and 19, at the rear portion of the outer circumferential surface of the first interchangeable lens 401, there is provided a red circular lens-side index (hereinafter, referred to as a first lens-side index) 408 serving as a mark for matching the phases of the bayonet lug 403 of the first interchangeable lens 401 with the phases where the bayonet lug do not exist in the first and second cameras 201 and 301 and the intermediate adapter, when the first interchangeable lens 401 is mounted on the first and second cameras 201 and 301 or the intermediate adapter through bayonet coupling.

Figure 20:
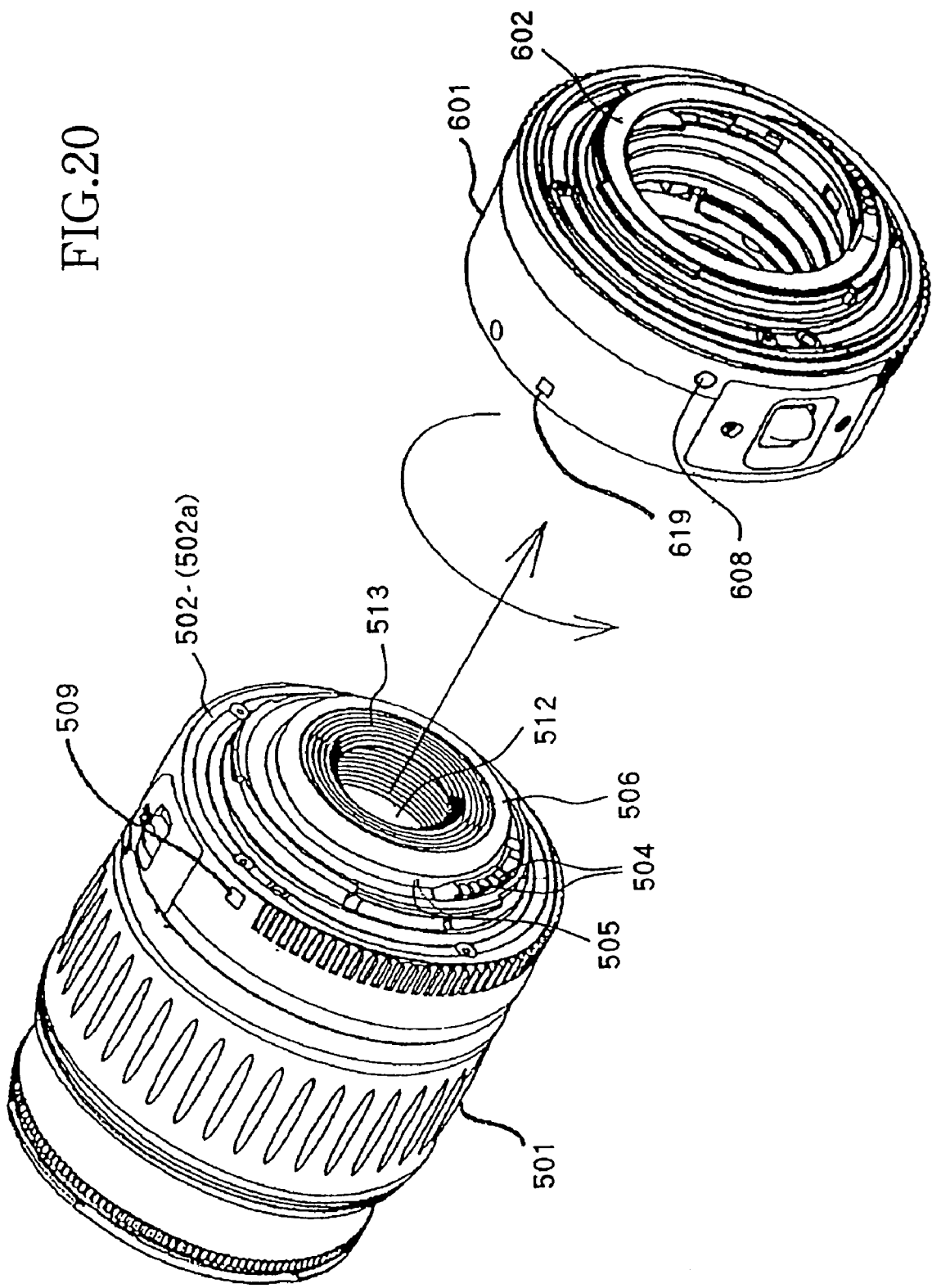
FIG. 20 is a perspective view illustrating a phase when the second interchangeable lens is mounted on the intermediate adapter according to Embodiment 2 of the present invention.

The second interchangeable lens 501 is shown in FIGS. 9, 12, 20, and 21. A plurality of optical lenses are arranged inside the second interchangeable lens 501. Only the rear end surface of the optical lens 512 positioned at a rearmost end is shown in FIGS. 9 and 20.

A ring-shaped mount 502 is located at the rear portion of the second interchangeable lens 501. The rear end surface of the outermost circumferential portion of the mount 502 serves as a reference surface (mount reference surface) 502*a* when the second camera 301 or the intermediate adapter is mounted.

In addition, the radially inner side portion of the mount reference surface 502*a* in the mount 502 has a protruding shape having a protruding amount larger than the protruding amount protruding toward the rear side from the mount reference surface 402*a* in the first interchangeable lens 401 described above.

And, at three circumferential locations of an intermediate position in the optical axis direction of the protruding portion, bayonet lug 503 which can be engaged with the bayonet lug of the second camera 301 and the intermediate adapter are formed. Here, the length from the mount reference surface 502*a* to the rear end surfaces of the bayonet lug 503 is the same as the length from the mount reference surface 402*a* to the rear end surfaces of the bayonet lug 403 in the first interchangeable lens 401.

In addition, the radially inner side portion of the bayonet lug 503 in the mount 502 protrudes toward the rear side.

Further, the portion extending from the mount reference surface 502a to the rear end surface of the portion protruding toward the rear side from the bayonet lug 503 corresponds to the protruding portion described in claims. The portion protruding toward the rear side from the bayonet lug 503 is referred to as a protruding portion 505 in Embodiment 2 for the sake of convenience.

As shown in FIG. 9, a protruding amount B of the rear end surface of the protruding portion 505 (precisely speaking, the rear end surface of a rubber ring 506 to be described later) from the mount reference surface 502a is larger than a protruding amount B' from the mount reference surface 402a toward the rear side in the first interchangeable lens 401 shown in FIG. 8.

The optical lens 512 is held at the innermost radial portion of the protruding portion 505 through the lens holding member 513. Further, the optical lens 512 may be fixed and may be movable in the direction of the optical axis within a range including the inner space of the protruding portion 505.

Here, the protruding amount of the protruding portion 505 is larger than the protruding amount in the first interchangeable lens 401. Therefore, when the second interchangeable lens 501 is directly mounted on the first camera 201, the bayonet coupling is prevented because the rear end surface of the protruding portion 505 comes into contact with the wall portion 205 of the first camera 201. In this way, when the second interchangeable lens 501 is rotated with respect to the first camera 201 in a state in which the protruding portion 505 comes into contact with the wall portion 205, the wall portion 205 or the protruding portion 505 may be damaged. For this reason, the rubber ring 506 is attached to the entire circumference of the rear end of the protruding portion 505 and covers around the circumference of the rear end surface of the protruding portion 505 in a ring shape. Further, the rear end surface of the rubber ring 506 protrudes slightly toward the rear side from the inner radial side of the rubber ring 506 (the rear end surface of the lens holding member 513). As a result, even in case the protruding portion 505 of the second interchangeable lens 501 can come into contact with the wall portion 205 of the first camera 201, the rubber ring 506 first comes into contact with the wall portion 205, so that it is possible to effectively repress the wall portion 205 or the protruding portion 505 from being damaged by means of the elastic force of the rubber ring.

Here, as shown in FIGS. 8 and 9, a flange back A, which is the distance from the mount reference surface 402a of the first interchangeable lens 401 to an image-taking surface (a light-receiving surface of the image pickup elements 210 and 310) 100 is equal to a flange back A, which is the distance from the mount reference surface 502a of the second interchangeable lens 501 to the image-taking surface (a light-receiving surface of the image pickup element 310) 100.

In addition, a back focus C, which is the distance from the optical lens 512 positioned at the rearmost end in the second interchangeable lens 501 to the image-taking surface 100 shown in FIG. 9, is smaller than a back focus C', which is the distance from the optical lens 412 positioned at the rearmost end in the first interchangeable lens 401 to the image-taking surface 100 shown in FIG. 8. Accordingly, since the second interchangeable lens has the smaller back focus, the second interchangeable lens 501 is advantageous in an optical design for widening a viewing angle. Further, in the second camera 301 on which the second interchangeable lens 501 is mounted, the image circle can be made small as described above due to the smaller back focus, so that the quick return mirror 306 can be made small.

On the other hand, in order to allow conventional image taking at the telephoto end, the first interchangeable lens 401 can be singly (without requiring the intermediate adapter) mounted on the second camera 301. Therefore, the first interchangeable lens 401 capable of being mounted on the first camera 201 can be also effectively used to the second camera 301.

Further, as shown in FIG. 20, at the rear portion of the outer circumferential surface of the second interchangeable lens 501, there is provided a white rectangular lens-side index (hereinafter, referred to as a second lens-side index) 509 serving as a mark for matching the phases of the bayonet lug 503 of the second interchangeable lens 501 with the phases where the bayonet lug do not exist in the second camera 301 and the intermediate adapter, when the second interchangeable lens 501 is mounted on the second camera 301 and the intermediate adapter through bayonet coupling.

Further, the phase of the second lens-side index 509 in the second interchangeable lens 501 with respect to the bayonet lug 503 is displaced by about 20° from the phase of the first lens-side index 408 in the first interchangeable lens 401 with respect to the bayonet lug 403.

In addition, a plurality of electrical connection points 504 are held on the mount 502, and the electrical connection points 504 are exposed at the slight rear side from the bayonet lug 503 and on the front side from the rear end surface of the protruding portion 505.

An intermediate adapter 601 to be mounted between the first and second interchangeable lenses 401 and 501 and the first and second cameras 201 and 301 is shown in FIGS. 8 to 12 and FIGS. 15 to 21. Further, here, the intermediate adapter 601 is described as an intermediate adapter for performing used for close-up image taking without an optical lens therein, but the intermediate adapter may be an intermediate adapter for increasing an image taking magnification with an optical lens therein. The structure of the intermediate adapter 601 will be described with reference to FIGS. 10, 15, 16, and 17.

A one end (the right side in FIG. 10) in the optical axis direction L of a cylindrical body 610 in the intermediate adapter 601 has a ring-shaped camera-side mount 602. The rear end surface of the outermost circumferential portion of the camera-side mount 602 serves as a reference surface (mount reference surface) 602a when the first and second cameras 201 and 301 are mounted thereon.

In addition, the radially inner side portion with respect to the mount reference surface 602a in the camera-side mount 602 has a shape protruding toward the rear side, and three bayonet lug 612 which can be engaged with the bayonet lug 203 and 303 of the first and second cameras 201 and 301 are formed at three positions on the outer circumference of the rear end of a protruding portion. The rear end surfaces of the bayonet lug 612 constitute the rear end surface of the intermediate adapter 601.

In addition, at the lower area of the rear end surface of the camera-side mount 602, a plurality of electrical connection points 604b for relaying the communication and power supply between one of the first and second cameras 201 and 301 and one of the first and second interchangeable lenses 401 and 501 are provided. Further, although these electrical connection points 604b are located at a position protruding slightly toward the rear side from the rear end surface of the intermediate adapter 601 (the camera-side mount 602), the protruding amount of the electrical connection points 604b will be neglected in the following description.

On the other hand, the other end (the left side in FIG. 10) in the optical axis direction L of the body 610 has a ring-shaped lens-side mount 603. The front end surface of the outermost circumferential portion of the lens-side mount 603 serves as a reference surface (mount reference surface) 603a when the first and second interchangeable lenses 401 and 501 are mounted.

At a position retreated to the rear side from the mount reference surface 603a on the radially inner side of the lens-side mount 603 (the radially inner side), three bayonet lug 613 for bayonet coupling to the first and second interchangeable lenses 401 and 501 are formed in the circumferential direction.

Further, at a position (inside the body 610) retreated to the rear side from the position where the bayonet lug 613 are located, a wall portion 605, which is perpendicular to the optical axis L, that is, parallel to the mount reference surface 603a, is formed. Here, the length from the mount reference surface 603a to the wall portion 605 is the same as the length from the mount reference surface 202a to the wall portion 205 in the first camera 201.

Further, a reception portion 607 for receiving the protruding portion 505 provided on the rear end side of the second interchangeable lens 501 is formed on the inner side of the wall portion 605. The reception portion 607 has a concave shape retreated to the rear side from the wall portion 605, and a circular opening is formed at the rear end surface (a third wall portion) 607a.

Further, at the lower area of the wall portion 605, there are provided a plurality of electrical connection pins 604a. The electrical connection pins 604a are electrically connected to the electrical connection points 604b inside the body 610, and relay the communication and power supply between one of the first and second cameras 201 and 301 and one of the first and second interchangeable lenses 401 and 501 together with the electrical connection points 604b.

Figure 15:
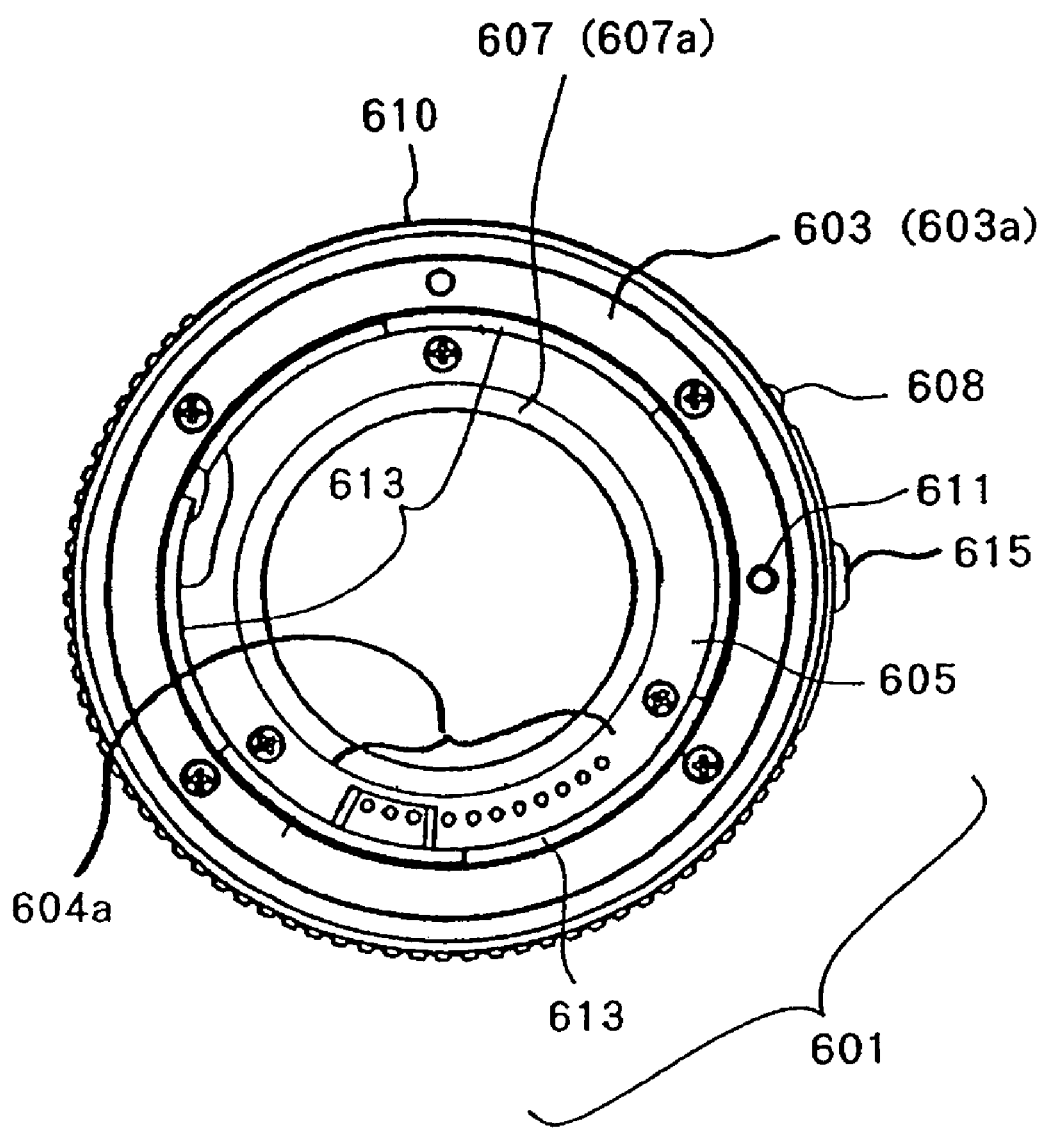
FIG. 15 is a front view of the intermediate adapter according to Embodiment 2 of the present invention.
Figure 17:
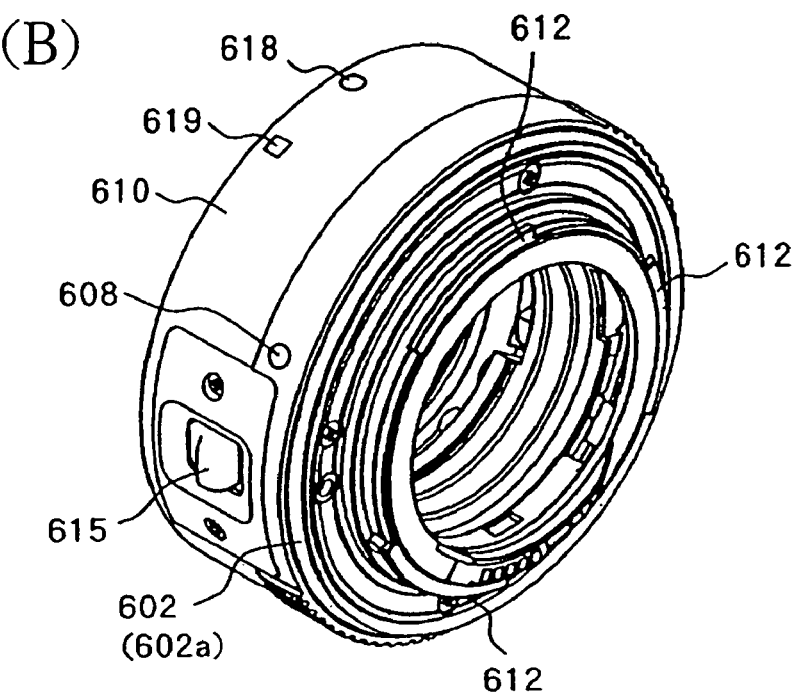
Figure 17:
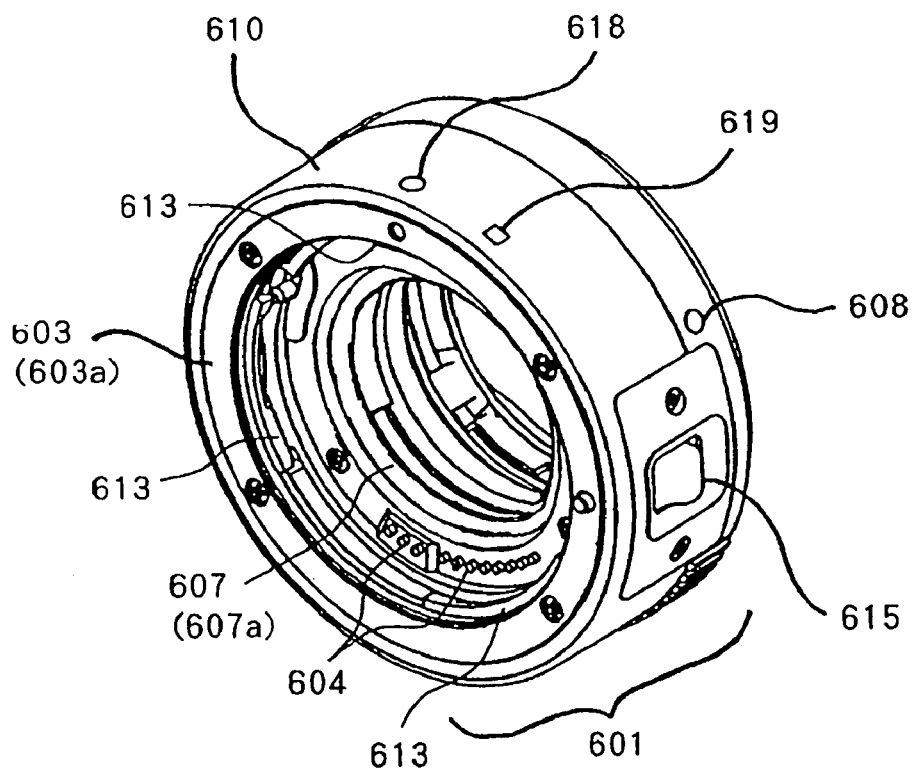

Furthermore, as shown in FIGS. 15 to 17, a locking pin 611 is located at one point in the circumferential direction of the lens-side mount 603. The locking pin 611 is energized to the front side by means of a spring (not shown), and is drawn to the rear side against the energizing force by operating an lock release lever 615 provided at the outer circumference of the body 610. The locking pin 611 is engaged with an opening portion formed in the mount reference surfaces of the first and second interchangeable lenses 401 and 501 mounted on the lens-side mount 603 through the bayonet coupling, thereby preventing the erroneous rotation of the interchangeable lens and the dropping of the interchangeable lens from the intermediate adapter 601. Further, by operating the lock release lever 615, the mounted interchangeable lens can be separated from the intermediate adapter 601.

Further, as shown in FIGS. 16A, 16B, 17A, and 17B, at a position near the lens-side mount 603 on the outer circumferential surface of the body 610, there is provided a first lens mounting index 618 of a red circle shape serving as a mark for matching the phases of the bayonet lug 403 of the first interchangeable lens 401 with the phases (the portions between two adjacent bayonet lug 613 in the circumferential direction) where the bayonet lug 613 positioned on the lens side do not exist in the intermediate adapter 601, when the intermediate adapter 601 is mounted on the first interchangeable lens 401 through bayonet coupling. Further, at a position near the lens-side mount 603 on the outer circumferential surface of the body 610 having a different phase from the first lens mounting index 618 (a position displaced in the circumferential direction by about 20°), there is provided a second lens mounting index 619 of a white rectangle shape serving as a mark for matching the phases of the bayonet lug 503 of the second interchangeable lens 501 with the phases (the portions between two adjacent bayonet lug 613 in the circumferential direction) where the bayonet lug 613 do not exist in the intermediate adapter 601, when the intermediate adapter 601 mounted on the second interchangeable lens 501 through bayonet coupling.

In addition, at a position near the camera-side mount 602 on the outer circumferential surface of the body 610 there is provided a red circular adapter mounting index 608 serving as a mark for matching the phases of the bayonet lug 612 provided on the camera-side mount 602 with the phases (the portions between two adjacent bayonet lug in the circumferential direction) where the bayonet lug do not exist in the first and second cameras 201 and 301, when the intermediate adapter 601 is mounted on the first and second cameras 201 and 301 through bayonet coupling.

Further, the mount structures (the shapes and dimensions) of the first camera 201 and the second camera 301 described in this embodiment are identical to each other including the shapes and dimensions of the bayonet lug. In addition, the mount structures (the shapes and dimensions) of the first interchangeable lens 401 and the second interchangeable lens 501 are identical to each other including the shapes and dimensions of the bayonet lug. And, the common mount structures capable of engaging with each other are provided in the cameras and the interchangeable lenses. Further, the camera-side mount structure of the intermediate adapter 601 is identical to the mount structures of the first and second interchangeable lenses 401 and 501, and the lens-side mount structure of the intermediate adapter 601 is identical to the mount structures of the first and second cameras 201 and 301.

However, among the three bayonet lug, there exist differences in circumferential length. As a result, only when two members (two of interchangeable lens, camera and intermediate adapter) capable of being connected to each other have a phase relation in which the three bayonet lug of one member can be inserted onto the three bayonet lug of the other member, the mounting of the two members is performed properly. The indexes for checking the phase relation are the indexes 208, 308, 309, 408, 509, 608, 618, and 619.

When the first interchangeable lens 401 is mounted on the intermediate adapter 601 constructed in this way, as shown in FIG. 18, the phase relation therebetween is determined such that the first lens-side index 408 provided on the first interchangeable lens 401 is matched with the first lens mounting index 618 provided on the intermediate adapter 601, and then the bayonet lug 403 of the first interchangeable lens 401 is inserted onto the portion between the bayonet lug 613 of the intermediate adapter 601. As a result, the mount reference surface 402a of the first interchangeable lens 401 comes into contact with the mount reference surface 603a of the intermediate adapter 601. At this time, as shown in FIGS. 8 and 11, since the protruding amount to the rear side from the mount reference surface 402a in the first interchangeable lens 401 is smaller than the length from the mount reference surface 603a to the wall portion 605 in the intermediate adapter 601, the contact between the mount reference surfaces 402a and 603a is not prevented.

Further, in this state, by rotating the first interchangeable lens 401 by a predetermined angle (until the locking pin 611 is locked) in the arrow direction of FIG. 18 with respect to the intermediate adapter 601, the bayonet lug 403 and 613 are engaged with each other (the front end surface of the bayonet lug 403 to come into contact with the rear end surface of the bayonet lug 613). In addition, as shown in FIG. 19, the mounting of the first interchangeable lens 401 to the intermediate adapter 601 is completed. In this state, the electrical connection pins 604a of the intermediate adapter 601 come into contact with the electrical connection points 404 of the first interchangeable lens 401.

In addition, when the second interchangeable lens 501 is mounted on the intermediate adapter 601, as shown in FIG. 20, the phase relation therebetween is determined such that the second lens-side index 509 provided on the second interchangeable lens 501 is matched with the second lens mounting index 619 provided on the intermediate adapter 601, and then the bayonet lug 503 of the second interchangeable lens 501 are inserted onto the portion between the bayonet lug 613 of the intermediate adapter 601. As a result, the mount reference surface 502a of the second interchangeable lens 501 comes into contact with the mount reference surface 603a of the intermediate adapter 601.

Here, as shown in FIGS. 9 and 12, since the protruding portion 505 of the second interchangeable lens 501 enters (to be received in) the reception portion 607 of the intermediate adapter 601, the contact between the mount reference surfaces 502a and 603a is not prevented. Further, the rear end surface of the protruding portion 505 (the rubber ring 506) is faced with the rear end surface 607a of the reception portion 607 with a slight gap therebetween.

Figure 21:
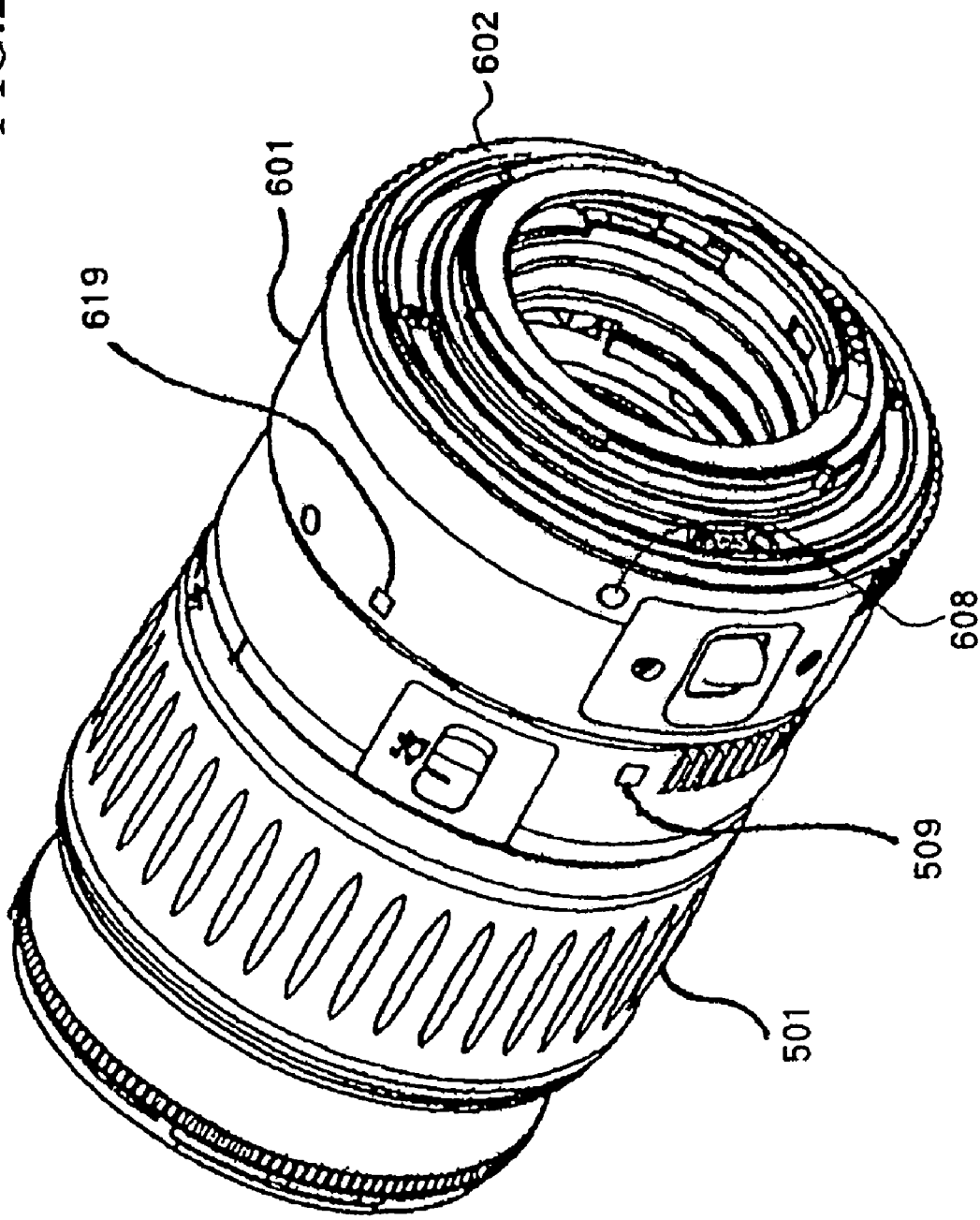
FIG. 21 is a perspective view illustrating a state when the second interchangeable lens is completely mounted on the intermediate adapter according to Embodiment 2 of the present invention.

And, in this state, by rotating the second interchangeable lens 501 by a predetermined angle (until the locking pin 611 is locked) in the arrow direction of FIG. 20 with respect to the intermediate adapter 601, the bayonet lug 503 and 613 are engaged with each other (the front end surface of the bayonet lug 503 to come into contact with the rear end surface of the bayonet lugs 613) and as shown in FIG. 21, the mounting of the second interchangeable lens 501 on the intermediate adapter 601 is completed. In this state, the electrical connection pins 604a of the intermediate adapter 601 come into contact with the electrical connection points 504 of the second interchangeable lens 501.

In this way, by providing the mounting indexes 618 and 619 in association with indexes of the first and second interchangeable lenses 401 and 501 in the intermediate adapter 601, the first and second interchangeable lenses 401 and 501 can be easily mounted on the intermediate adapter 601, thereby completely preventing erroneous mountings.

In addition, when the intermediate adapter 601 is mounted on the first camera 201 and the second camera 301 (hereinafter, generally referred to simply as a camera), the phase relation therebetween is determined such that the adapter mounting index 608 provided on the intermediate adapter 601 is matched with the lens mounting index (the lens mounting index 208 on the first camera 201 and the first lens mounting index 308 on the second camera 301) provided in the camera, and then the bayonet lug 612 of the intermediate adapter 601 is inserted onto the portion between the bayonet lug in the camera. As a result, the mount reference surface 602a of the intermediate adapter 601 comes into contact with the mount reference surface of the camera. Here, as shown in FIGS. 8, 9, 11, and 12, since the protruding amount to the rear side from the mount reference surface 602a in the intermediate adapter 601 is smaller than the length from the mount reference surfaces to the wall portions 205 and 305 in the camera, the contact between the mount reference surfaces is not prevented.

And, in this state, by rotating the intermediate adapter 601 by a predetermined angle (until a locking pin (not shown) provided in the camera is locked) in a predetermined direction with respect to the camera, the bayonet lug are engaged with each other (the front end surfaces of the bayonet lug 612 come into contact with the rear end surfaces of the bayonet lug of the camera), thereby completing the mounting of the intermediate adapter 601 on the camera. In addition, in this state, the electrical connection points 604b of the intermediate adapter 601 come into contact with the electrical connection pins of the camera, thereby enabling the communication between the camera and the interchangeable lens through the intermediate adapter 601 and the electric power supplying to the interchangeable lens from the camera.

By performing the mounting operation as described above, there are provided a combination in which the first interchangeable lens 401 is mounted on the first camera 201 through the intermediate adapter 601 as shown in FIG. 11, a combination in which the second interchangeable lens 501 is mounted on the first camera 201 through the intermediate adapter 601 as shown in FIG. 12, a combination in which the first interchangeable lens 401 is mounted on the second camera 301 through the intermediate adapter 601 as shown in FIG. 8, and a combination in which the second interchangeable lens 501 is mounted on the second camera 301 through the intermediate adapter 601 as shown in FIG. 9. By using any above combination, image taking operation can be performed.

As described above, the intermediate adapter 601 described in Embodiment 2 can be mounted on all the first and second interchangeable lenses 401 and 501 and the first and second cameras 201 and 301. For this reason, in addition to the combination of the first camera 201 and the first interchangeable lens 401 and the combination of the second camera 201 and the first and second interchangeable lenses 401 and 501, which can be mounted directly, the combination of the first camera 201 and the second interchangeable lens 501, which cannot be mounted directly, can also be utilized. Moreover, all the combinations can be realized with one intermediate adapter 601.

Therefore, without preparing a plurality of intermediate adapters, it is possible to enhance the degree of freedom in selection of combinations of cameras and interchangeable lenses, that is, to enhance a range of utilization modes of a camera system.

In addition, since the reception portion for receiving the protruding portion 505 of the second interchangeable lens 501 is formed in the intermediate adapter 601, the wall portion 605 of the intermediate adapter 601 and the protruding portion 505 can be repressed from being damaged when the second interchangeable lens 501 is mounted. Particularly, in this embodiment, since the rubber ring 506 is mounted at the rear end portion of the protruding portion 505, the wall portion 605 and the protruding portion 505 can be repressed from being damaged. Further, the rubber ring 506 is not necessarily required.

As described above, according to the above embodiments, since one intermediate adapter can be mounted on all the first and second interchangeable lenses and the first and second cameras, it is possible to use a combination of the second interchangeable lens and the first camera which can not be combined (mounted) directly without a plurality of intermediate adapters, so that the degree of freedom in selection of combinations of cameras and interchangeable lenses (a range of utilization modes of a camera system) can be enhanced. Further, since the wall portion in the intermediate adapter is provided at a position retreated from the protruding portion of the second interchangeable lens, it is possible to repress prevent the intermediate adapter and the protruding portion from being damaged when the second interchangeable lens is mounted.

Since the first and second indexes are provided on the intermediate adapter, the first and second interchangeable lenses can be easily mounted on the intermediate adapter, and erroneous mounting can be repressed.

Further, since a plurality of lens mounting indexes are provided near the lens-side mount of the intermediate adapter, a user can easily recognize that the intermediate adapter can be used for a plurality of interchangeable lenses (camera systems) having different back focuses, so that it is possible to provide an intermediate adapter, the mounting operation can be easily performed by the user.

Here, by providing the mounting indexes in association with the respective camera systems at different mounting angular positions and by matching the lens mounting indexes in association with the respective camera systems to determine the mount inserting positions when the real mounting operation is performed, it is possible to provide an intermediate adapter whose mounting operation can be much easily performed by a user.

Furthermore, by setting the shapes or colors of the lens mounting indexes in association with the respective camera systems to be different from each other, the lens mounting indexes having the shapes or colors in association with the respective camera systems can be matched with each other to determine the mount inserting positions when the real mounting operation is performed, so that it is possible to provide an intermediate adapter whose mounting operation can be much easily performed by a user.

Moreover, by allowing the intermediate adapter to be used in common for a group of interchangeable lenses manufactured with different back focuses, the interchangeable lenses having different back focuses can easily be mounted on a camera through the intermediate adapter to perform an image taking.

While preferred embodiments have been described, it is to be understood that modification and variation of the present invention may be made without departing from the scope of the following claims.

This application claims priorities from Japanese Patent Applications No. 2003-329134 filed on Sep. 19, 2003 and No. 2003-205285 filed on Aug. 1, 2003, which are hereby incorporated by reference herein.

What is claimed is:

1. An intermediate adapter used in a camera system, the camera system comprising:
   a first interchangeable lens;
   a second interchangeable lens including a protruding portion protruding toward an image plane from its mount reference surface whose protruding amount is larger than that of the first interchangeable lens, and having a flange back equal to that of the first interchangeable lens;
   a first camera on which the first interchangeable lens is mounted, the first camera including a first wall portion inside its mount and preventing mounting of the second interchangeable lens by the protruding portion of the second interchangeable lens contacting the first wall portion; and
   a second camera on which the first interchangeable lens and the second interchangeable lens are selectively mounted, the second camera including a second wall portion provided inside its mount at a position retreated from the protruding portion of the second interchangeable lens,
   the intermediate adapter comprising:
   a third wall portion provided inside its mount at a position retreated from the protruding portion of the second interchangeable lens,
   wherein the intermediate adapter is mounted between the first interchangeable lens and the first and second cameras, and is mounted between the second interchangeable lens and the first and second cameras.

2. An intermediate adapter used with a first camera on which a first interchangeable lens is mounted and a second camera on which the first interchangeable lens and a second interchangeable lens are mounted,
   the second interchangeable lens including a protruding portion protruding toward an image plane from its mount reference surface whose protruding amount is larger than that of the first interchangeable lens, and having a flange back equal to that of the first interchangeable lens,
   the first camera including a first wall portion inside its mount and preventing mounting of the second interchangeable lens by the protruding portion of the second interchangeable lens contacting the first wall portion,
   the second camera including a second wall portion provided inside its mount at a position retreated from the protruding portion of the second interchangeable lens,
   the intermediate adapter comprising:
   a third wall portion provided inside its mount at a position retreated from the protruding portion of the second interchangeable lens,
   wherein the intermediate adapter is mounted between the first interchangeable lens and the first and second cameras and is mounted between the second interchangeable lens and the first and second cameras.

3. The intermediate adapter according to claim 1,
   wherein the intermediate adapter is mounted on the first and second interchangeable lenses and the first and second cameras through bayonet coupling, and
   wherein the intermediate adapter further includes:
   a first index serving as a mark for determining a phase relation with the first interchangeable lens when being mounted on the first interchangeable lens; and
   a second index provided at a position of a phase different from the first index, the second index serving as a mark for determining a phase relation with the second interchangeable lens when being mounted on the second interchangeable lens.

4. The interchangeable lens according to claim 2,
   wherein the intermediate adapter is mounted on the first and second interchangeable lenses and the first and second cameras through bayonet coupling, and
   wherein the intermediate adapter further includes:
   a first index serving as a mark for determining a phase relation with the first interchangeable lens when being mounted on the first interchangeable lens; and
   a second index provided at a position of a phase different from the first index, the second index serving as a mark for determining a phase relation with the second interchangeable lens when being mounted on the second interchangeable lens.

5. A camera system comprising:
   a first interchangeable lens;
   a second interchangeable lens including a protruding portion protruding toward an image plane from its mount reference surface whose protruding amount is larger than that of the first interchangeable lens, and having a flange back equal to that of the first interchangeable lens;
   a first camera on which the first interchangeable lens is mounted, the first camera including a first wall portion inside its mount and preventing mounting of the second interchangeable lens by the protruding portion of the second interchangeable lens contacting the first wall portion;
   a second camera on which the first and the second interchangeable lenses, the second camera including a second wall portion provided inside its mount at a position retreated from the protruding portion of the second interchangeable lens; and an intermediate adapter, wherein the intermediate adapter includes a third wall portion provided inside its mount at a position retreated from the protruding portion of the second interchangeable lens, and the intermediate adapter is mounted between the first interchangeable lens and the first and second cameras and is mounted between the second interchangeable lens and the first and second cameras.

6. The camera system according to claim 5, wherein the intermediate adapter is mounted on the first and second interchangeable lenses and the first and the second cameras through bayonet coupling, and wherein the intermediate adapter further includes:

a first index serving as a mark for determining a phase relation with the first interchangeable lens when being mounted on the first interchangeable lens; and a second index provided at a position of a phase different from the first index, the second index serving as a mark for determining a phase relation with the second interchangeable lens when being mounted on the second interchangeable lens.

7. An intermediate adapter to be mounted between a camera and an interchangeable lens, the intermediate adapter comprising:

a plurality of indexes provided on an interchangeable lens-side of the intermediate adapter and serving as marks when being mounted on the interchangeable lens, wherein the plurality of indexes are provided at different phase positions on the intermediate adapter.

8. The intermediate adapter according to claim 7, wherein the plurality of indexes are different from each other in at least one of shape and color.

9. The intermediate adapter according to claim 7, wherein the intermediate adapter can be mounted on at least two interchangeable lenses having different back focuses.

* * * * *